US010642228B1

(12) United States Patent
Cardinali et al.

(10) Patent No.: US 10,642,228 B1
(45) Date of Patent: May 5, 2020

(54) LED-BACKED HOUSING SPLIT OF A PORTABLE ELECTRONIC DEVICE

(71) Applicant: Apple Inc., Cupertino, CA (US)

(72) Inventors: Steven P. Cardinali, Woburn, MA (US); Amin M. Younes, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 133 days.

(21) Appl. No.: 15/874,689

(22) Filed: Jan. 18, 2018

Related U.S. Application Data

(60) Provisional application No. 62/559,440, filed on Sep. 15, 2017.

(51) Int. Cl.
| | | |
|---|---|---|
| *G04G 9/04* | (2006.01) | |
| *G04G 9/00* | (2006.01) | |
| *G09G 3/12* | (2006.01) | |
| *G04G 17/08* | (2006.01) | |

(52) U.S. Cl.
CPC ............. *G04G 9/04* (2013.01); *G04G 9/0041* (2013.01); *G04G 17/08* (2013.01); *G09G 3/12* (2013.01)

(58) Field of Classification Search
CPC ........ G04G 9/04; G04G 17/08; G04G 9/0041; G09G 3/12
See application file for complete search history.

(56) References Cited

U.S. PATENT DOCUMENTS

| | | | | |
|---|---|---|---|---|
| 3,757,511 | A * | 9/1973 | Burgess | G04C 10/02 368/83 |
| 5,088,070 | A * | 2/1992 | Shiff | G04G 21/00 345/156 |
| 6,999,685 | B1* | 2/2006 | Kawase | A61B 5/0031 398/129 |
| 8,935,119 | B2* | 1/2015 | Yuen | G01B 21/16 702/138 |
| 9,462,633 | B2* | 10/2016 | Shim | H04M 1/72569 |
| 9,757,068 | B2 | 9/2017 | Cantrell | |
| 9,869,974 | B2* | 1/2018 | Kang | G02B 6/0068 |
| 2001/0017663 | A1* | 8/2001 | Yamaguchi | H04N 1/00249 348/373 |
| 2006/0092770 | A1* | 5/2006 | Demas | G04B 19/235 368/223 |
| 2009/0059730 | A1* | 3/2009 | Lyons | G04G 21/08 368/69 |

(Continued)

FOREIGN PATENT DOCUMENTS

| | | |
|---|---|---|
| WO | 03026358 A1 | 3/2003 |
| WO | 2013188891 A2 | 12/2013 |

*Primary Examiner* — Tsion Tumebo
(74) *Attorney, Agent, or Firm* — Dorsey & Whitney LLP

(57) ABSTRACT

This application relates to a wearable electronic device including a housing having an illumination region, where the housing can carry components that can include a processor capable of receiving an input signal and responding to the input signal by providing an illumination signal. The components can further include independently-controllable light-emitting units carried by the housing at the illumination region and in communication with the processor, the light-emitting units capable of (i) receiving the illumination signal from the processor, and (ii) presenting the notification by emitting an amount of light in accordance with the illumination signal.

17 Claims, 14 Drawing Sheets

(56) References Cited

U.S. PATENT DOCUMENTS

| | | | | |
|---|---|---|---|---|
| 2011/0182151 A1* | 7/2011 | Geyer | ............... | G04G 9/0017 368/11 |
| 2012/0122519 A1* | 5/2012 | Jochheim | ............ | H04B 1/385 455/556.1 |
| 2014/0297217 A1* | 10/2014 | Yuen | .................. | G01B 21/16 702/138 |
| 2017/0303646 A1 | 10/2017 | Bricken et al. | | |
| 2019/0034036 A1* | 1/2019 | Hiraide | ............... | G06F 1/163 |

* cited by examiner

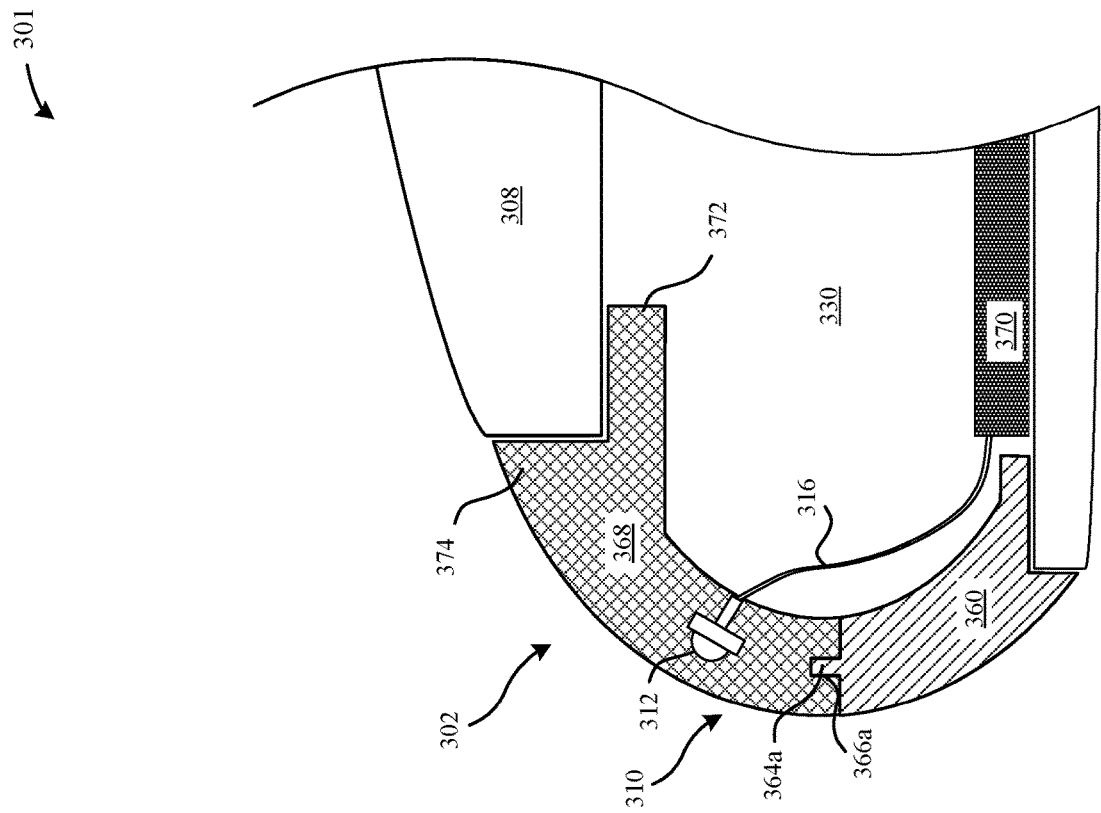
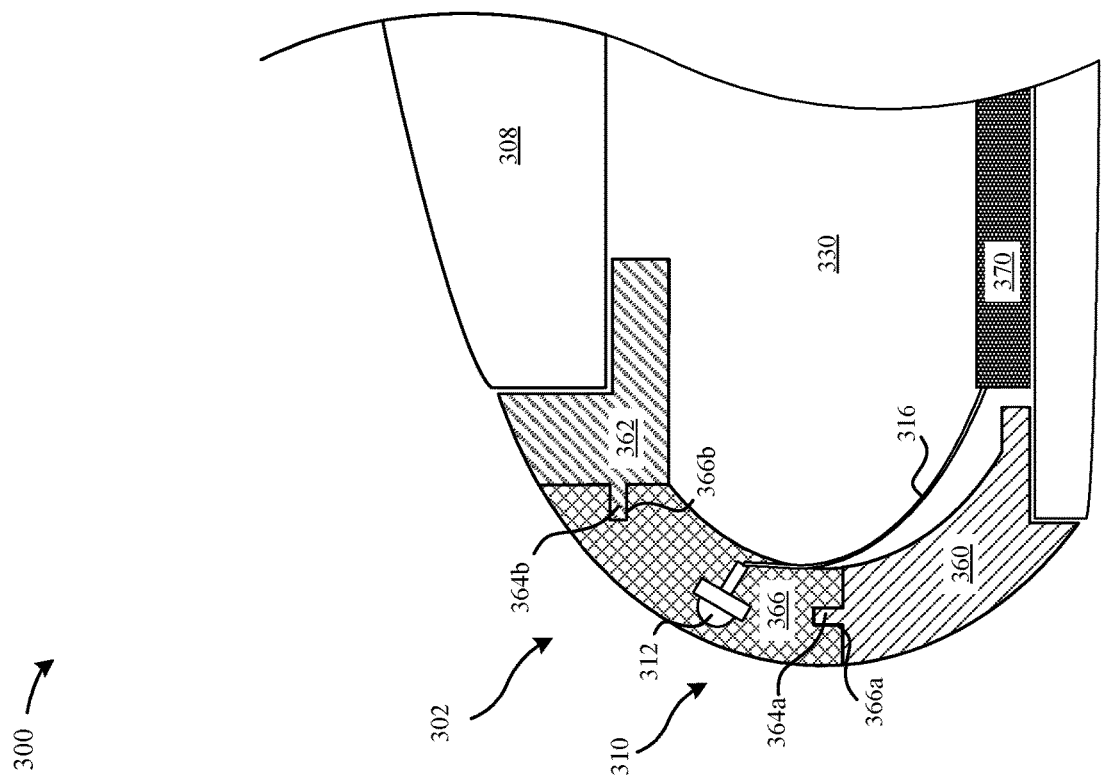
FIG. 3A
FIG. 3B

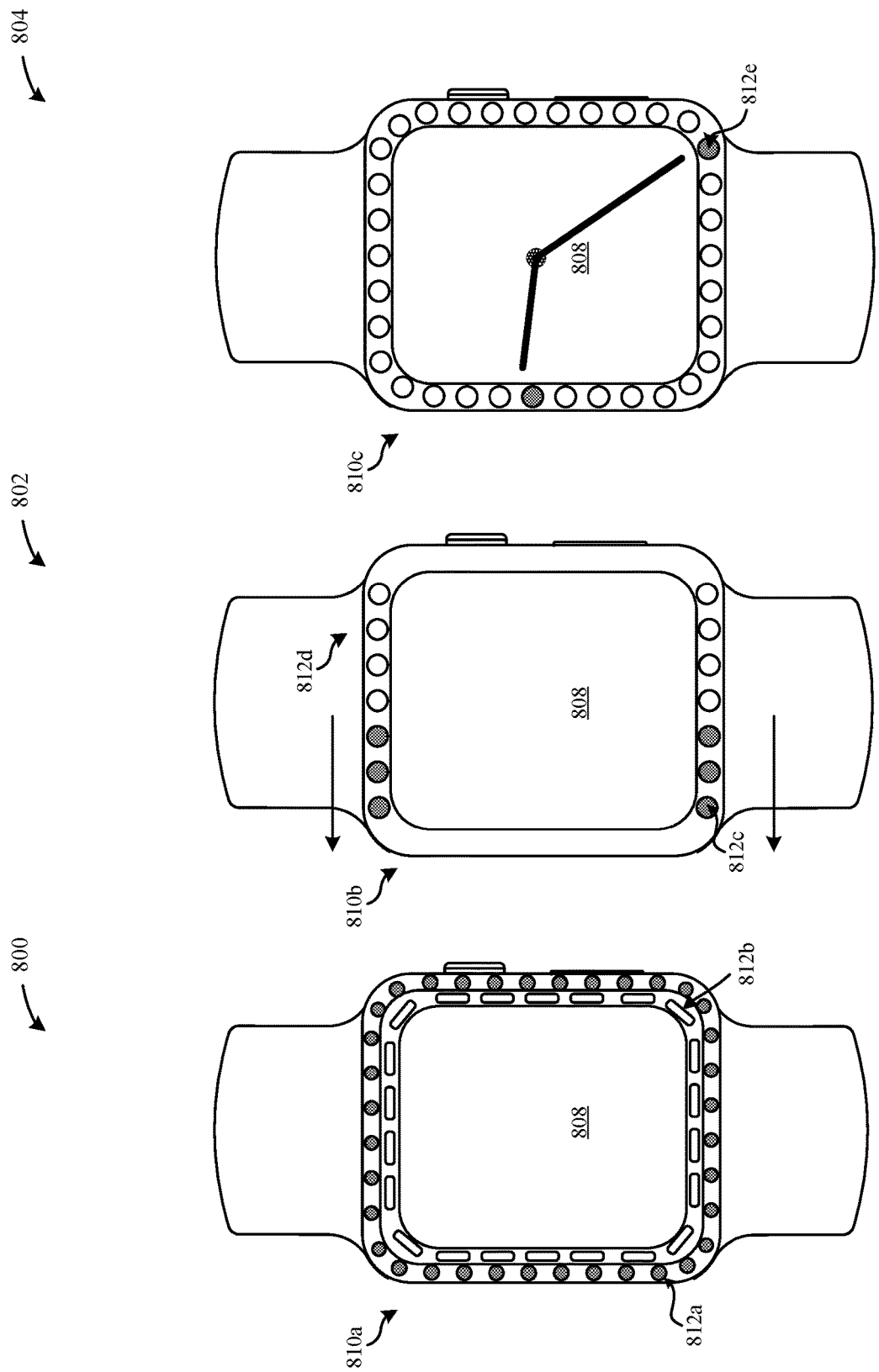

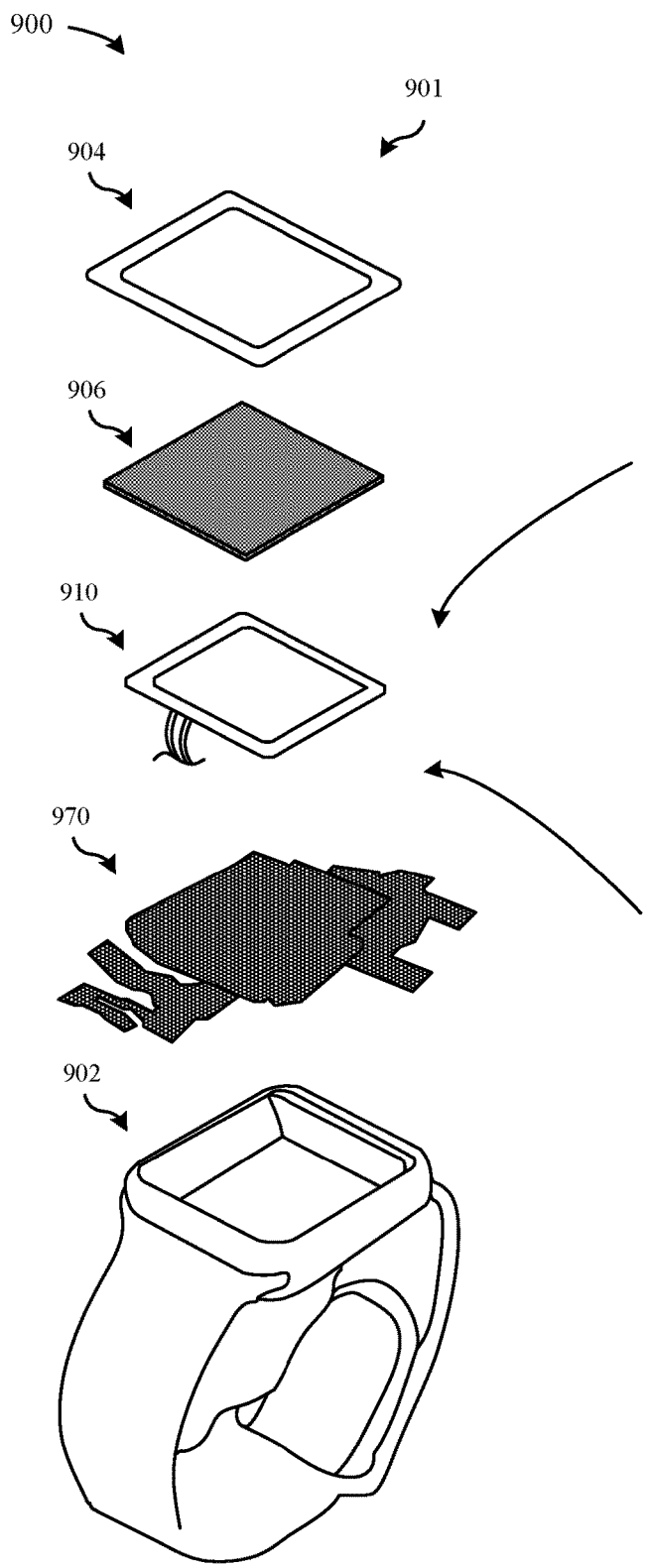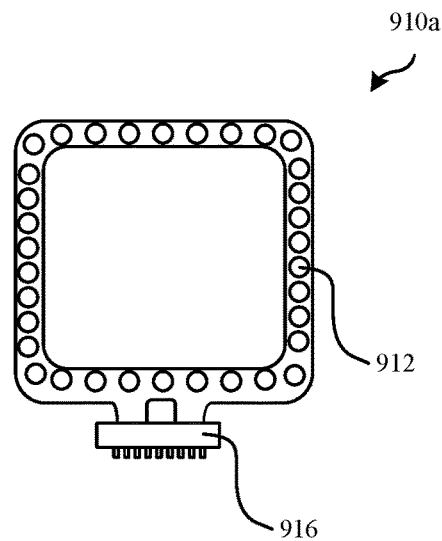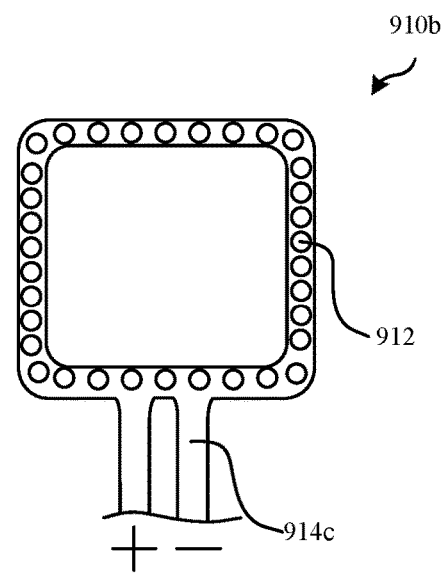
FIG. 9B
FIG. 9C
FIG. 9A

LED-BACKED HOUSING SPLIT OF A PORTABLE ELECTRONIC DEVICE

CROSS-REFERENCE TO RELATED APPLICATIONS

The present application claims the benefit of U.S. Provisional Application No. 62/559,440, entitled "LED-BACKED HOUSING SPLIT OF A PORTABLE ELECTRONIC DEVICE," filed Sep. 15, 2017, which is incorporated herein by reference in its entirety for all purposes.

FIELD

The described embodiments relate generally to a portable electronic device having a display capable of presenting a user interface and a light-notification unit capable of presenting a user notification. More particularly, the light-notification unit can be controlled independently of the display.

BACKGROUND

In recent years, there has been a proliferation in the number of users who heavily rely upon portable electronic devices to provide important reminders, notifications, and alerts that are pertinent to their daily activities. In particular, many of these users desire to receive such information in a quick and easily-understandable manner. However, many conventional portable electronic devices instead present this information in an inconvenient and generally inaccessible manner, which can diminish the overall user experience.

SUMMARY

To cure the foregoing deficiencies, the representative embodiments set forth herein disclose various techniques related generally to a portable electronic device having a display capable of presenting a user interface and a light-notification unit capable of presenting a notification. More particularly, the light-notification unit can be controlled independently of the display.

According to some embodiments, a wearable electronic device for presenting a notification is described. The wearable electronic device can include a housing capable of carrying components, the housing having an illumination region that includes light-transmissive material. The components can include a processor capable of receiving an input signal and responding to the input signal by providing an illumination signal. The components can further include independently-controllable light-emitting units carried by the housing at the illumination region and in communication with the processor, the light-emitting units capable of (i) receiving the illumination signal from the processor, and (ii) presenting the notification by emitting an amount of light in accordance with the illumination signal.

According to some embodiments, a wearable electronic device for presenting an illuminated notification is described. The wearable electronic device can include a housing capable of carrying components and having a luminescence section that includes light-transmissive material. The components can include a processor and a display assembly in communication with the processor and overlaid by a protective cover, where the display assembly is capable of (i) detecting a touch event at the protective cover, and (ii) providing a corresponding detection signal to the processor that, in turn, provides an illumination signal. The components can further include light-notification units in communication with the processor, where the light-notification units are carried by the housing at the luminescence section, and the light-notification units are capable of (i) receiving the illumination signal from the processor, and (ii) cooperatively emitting a pattern of light some of which partially passes through the light-transmissive material, where at least some of the pattern of light corresponds to the illuminated notification.

According to some embodiments, a wearable electronic device for presenting a notification is described. The wearable electronic device can include a housing having an illumination section that includes light-transmissive material. The components can include an environmental sensor capable of (i) detecting an environmental stimulus, and (ii) providing a corresponding detection signal. The components can further include a processor in communication with the environmental sensor, the processor capable of (i) receiving the detection signal from the environmental sensor, and (ii) responding by generating an illumination signal that is based on the detection signal. The components can further include light-emitting units in communication with the processor and carried by the housing at the illumination section, where the light-emitting units are capable of (i) receiving the illumination signal from the processor, and (ii) responding by emitting a predetermined amount of light in accordance with the illumination signal that corresponds to the notification.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIGS. 3A-3B illustrate cross-sectional views of a portable electronic device that can be capable of implementing the various techniques described herein, according to some embodiments.

FIGS. 8A-8C illustrate top views of various examples of portable electronic devices that can be capable of implementing the various techniques described herein, according to some embodiments.

FIGS. 9A-9C illustrate various views of an exploded view for forming a portable electronic device that can be capable of implementing the various techniques described herein, according to some embodiments.

Figure 1B:
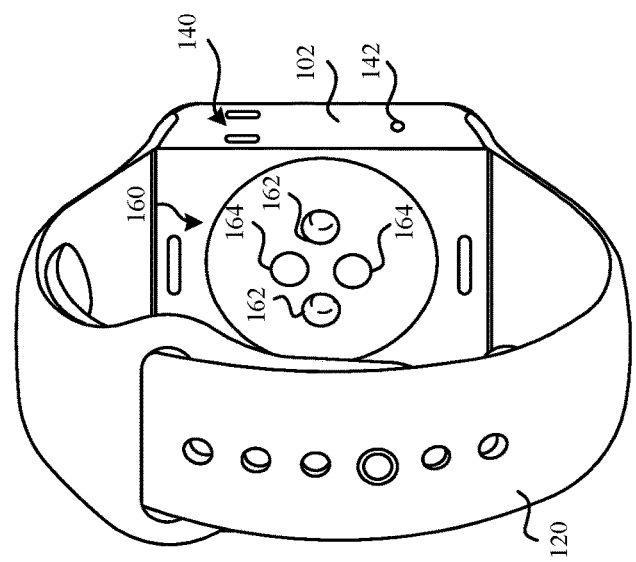
FIGS. 1A-1C illustrate perspective views of a portable electronic device that can be capable of implementing the various techniques described herein, according to some embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments described herein set forth techniques related to a portable electronic device having a display capable of presenting a user interface and a light-notification unit capable of presenting a user notification. More particularly, the light-notification unit can be controlled independently of the display assembly such as to present information that can supplement information presented by the user interface. In some embodiments, the light-notification unit can present information that is independent of information presented by the user interface. Although technological advances in recent years have enabled a single portable electronic device to execute a variety of different functions in order to present different information to a user, the presentation of the information by the single portable electronic device is generally limited to a single visual-generating component (i.e., a single display). Consequently, when the single portable electronic device is tasked with displaying multiple types of information, the single portable electronic device must often prioritize an order of the different types of user information to be presented to the user. Further complicating matters is that the user must often perform a series of steps (e.g., unlocking the portable electronic device with a password, etc.) in order to access this user information. While these series of steps may be important for securing confidential information from others users, it can also be burdensome to perform these series of steps when the user information to be presented is not confidential in nature and should be presented in a quick and easily-understood manner.

Furthermore, while the display assembly can include a light-emitting diode (LED) or organic light-emitting diode (OLED) display that is capable of presenting a combination of brilliant colors and advanced graphics, certain types of user information may not need to be presented with such advanced colors and/or graphs that can consume a considerable amount of power from a power supply of the portable electronic device. In the interest of conserving power, the portable electronic device can rely upon another means (besides the display assembly) to present visual user information. More particularly, the described embodiments involve the light-emitting notification unit being independently controllable from the display. For example, the user may wish to receive notifications or information without having to activate the display. Additionally, the light-emitting notification unit can be capable of providing detailed user information while consuming very little power.

According to some embodiments, a wearable electronic device for presenting a notification is described. The wearable electronic device can include a housing capable of carrying components, the housing having an illumination region that includes light-transmissive material. The components can include a processor capable of receiving an input signal and responding to the input signal by providing an illumination signal. The components can further include independently-controllable light-emitting units carried by the housing at the illumination region and in communication with the processor, the light-emitting units capable of (i) receiving the illumination signal from the processor, and (ii) presenting the notification by emitting an amount of light in accordance with the illumination signal.

According to some embodiments, the portable electronic device can refer to a media player, a camera, a smartphone, a smartwatch, a computer tablet, a portable computer, a fitness tracker, a medical diagnostic device, a health-monitoring tool, a touchscreen electronic device, and the like.

These and other embodiments are discussed below with reference to FIGS. 1A-1C, 2A-2B, 3A-3B, 4, 5A-5B, 6, 7A-7B, 8A-8C, 9A-9C, and 10-13; however, those skilled in the art will readily appreciate that the detailed description given herein with respect to these figures is for explanatory purposes only and should not be construed as limiting.

Figure 1A:
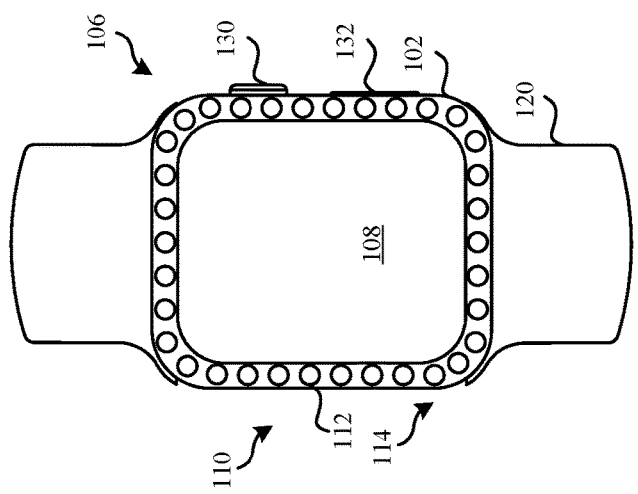
Figure 1C:
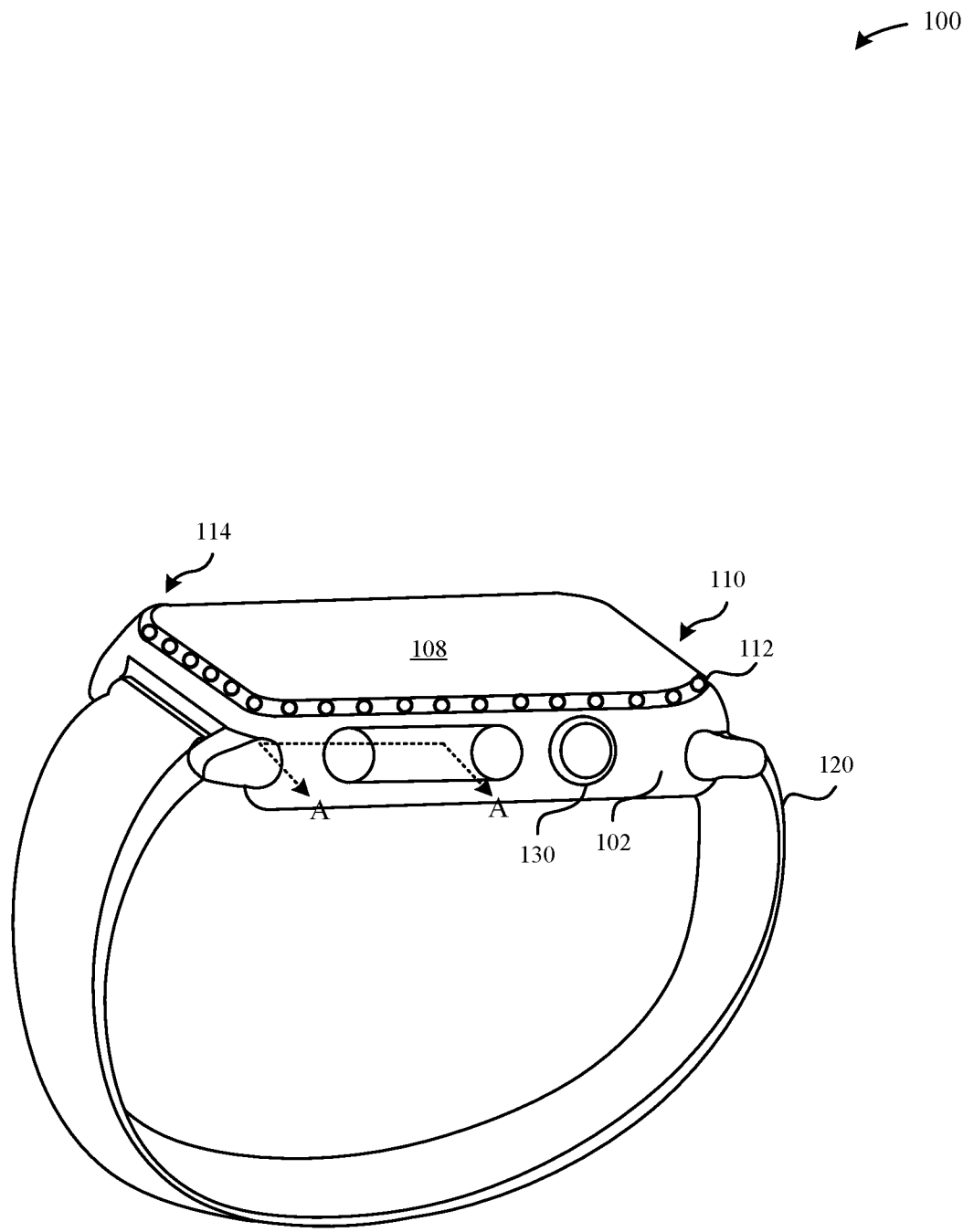

FIGS. 1A-1C illustrate perspective views of a portable electronic device 100 that can be capable of implementing the various techniques described herein, according to some embodiments. In particular, the portable electronic device 100 can be configured to present a light notification that corresponds to user information.

As illustrated in FIG. 1A, the portable electronic device 100 can include a housing 102 that can be configured to carry components within an internal cavity (not illustrated), including a display assembly 106 and a light-notification unit 110. The display assembly 106 can include a cover layer 108 that is capable of receiving a touch event executed by a user of the portable electronic device 100. In some examples, the display assembly can include a sensor (e.g., capacitive sensor, resistance sensor, piezoelectric element sensor, etc.) for detecting the touch event at the cover layer 108. In response, the sensor can transmit a detection signal to a processor (not illustrated) that is descriptive of the touch event. In some examples, the display assembly 106 can include a combination of force input and/or touch input sensors that can be integrated into the display assembly 106 for detecting the touch event at the cover layer 108. In response to detecting the touch event, the processor can cause the display assembly 106 to present a user interface that corresponds to the touch event. According to some examples, the user interface can include visual icons (or visual content) that convey user information and that are capable of being selected by at least one of a touch event at the touch input layer/force input layer of the display assembly 106, a rotatable digital crown 130 or the I/O component 132 (e.g., buttons, switches, etc.), thereby causing the display assembly 106 to update the visual icons that are presented.

Additionally, the light-notification unit 110 can include one or more light-emitting units 112. As illustrated in FIG. 1A, the light-emitting units 112 can be arranged in a pattern along a peripheral face region 114 of the housing 102. By having the light-emitting units 112 disposed along the peripheral face region 114 of the housing 102, any light indications generated by the light-emitting units 112 can be readily discernable and seen by the user in at least the same capacity that a user interface presented by the display assembly 106 would also be readily visible to the user. For example, both of the light-emitting units 112 and the display assembly 106 can present notifications that are transmitted at a same angle to a user relative to the housing 102.

In some examples, the light-emitting units 112 can be arranged in the pattern along a face of the housing 102 (e.g., a front face opening), a side wall of the housing 102, a bottom surface of the housing 102, or a curved/beveled edge surface of the housing 102. Additionally, each of the light-emitting units 112 can have dimensions (e.g., surface area, etc.) that are significantly less than the corresponding dimensions of the display assembly 106. In some examples, the light-notification unit 110 has an area that is less than an area of the display assembly 106.

Furthermore, the arrangement of the light-emitting units 112 along the portable electronic device 100 can be such as to cosmetically enhance or improve upon the appearance of the housing 102 of the portable electronic device 100. For example, the pattern of the light-emitting units 112 should not significantly detract from appearance design aesthetic of the housing 102. Accordingly, the light-emitting units 112 are disposed along the peripheral face region 114 of the housing 102; therefore, preventing the cover layer 108 from being obstructed. In some examples, the light-emitting units 112 can be user-adjustable to emit a color that corresponds, contrasts, and/or matches the color of the display assembly 106. Additionally, the color and/or pattern emitted by the light-emitting units 112 can correspond, contrast, and/or match with a color of the housing 102.

In some examples, at least one of the light-emitting units 112 and the display assembly 106 can include light-emitting diodes (LED), organic light-emitting diodes (OLED), and the like. Beneficially, the light-emitting units 112 have a significantly reduced surface area relative to the display assembly 106 and can include LEDs or OLEDs. The amount of power consumed by the light-emitting units 112 is reduced relative to the display assembly 106.

According to some examples, the housing 102 can include a combination of seals and/or gaskets to prevent water intrusion or minimize water intrusion into any one of the components as described herein. Additionally, the internal cavity of the housing 102 can include a combination of seals to minimize moisture intrusion and/or external contaminants into the internal cavity. In some examples, these seals can seal gaps, cracks, interfaces between housing sections, and the like in order to prevent moisture ingress into the internal cavity of the housing 102.

As illustrated in FIG. 1A, the housing 102 can be coupled to a user attachment mechanism 120, such as a wrist strap, band, and the like. In some examples, the housing 102 can be integrally formed with parts of the user attachment mechanism 120. The user attachment mechanism 120 can enable the portable electronic device 100 to be secured to a user's wrist, arm, or other appendage. Additionally, the housing 102 can include a rotatable digital crown 130 and an I/O component 132. The rotatable digital crown 130 and the I/O component 132 can be capable of toggling user functions presented at the user interface of the display assembly 106. Additionally, the rotatable digital crown 130 and the I/O component 132 can be capable of adjusting user settings for the light-notification unit 110, such as adjusting at least one of brightness, color, frequency, duration, and the like.

Referring now to FIG. 1B, the portable electronic device 100 can include speakers 140 and a microphone 142 that are disposed at a side surface of the housing 102. The portable electronic device 100 can include multiple sensing modules 160 that are disposed at a bottom surface of the housing 102. According to some examples, the multiple sensing modules 160 can include LED lights 162 that are paired with light-sensitive photodiodes 164. Generally, these LED lights 162 are not visible to a user when the portable electronic device 100 is worn, as the bottom surface of the housing 102 is generally flush against the user's skin. Thus, these LED lights 162 are generally not capable of providing a user notification. Instead the LED lights 162 can emit an amount of green light and/or infrared light at the user's skin and detect an amount of green light/IR light absorption by the user's skin. Subsequently, the light-sensitive photodiodes 164 can provide a detection signal to the processor that corresponds to the amount of light absorbed by the user skin. The light generated by these LED lights 162 can be generally fixed, such that color, duration, frequency are not capable of being adjusted by the user and/or the portable electronic device 100. Furthermore, the light generated by these LED lights 162 generally fail to provide user information or notifications as the light is merely intended to be directed at the user's skin for the purpose of measuring an amount of light absorption. For example, the amount of light generated by the LED lights 162 may not correspond to a feedback signal provided by a sensor (e.g., the microphone 142, etc.) included within the portable electronic device 100, such as when the sensor detects an event. Additionally, when the portable electronic device 100 is worn, these LED lights 162 emit light that is generally not discernible by the user.

FIG. 1C illustrates a perspective view of the portable electronic device 100. The housing 102 can include a peripheral face region 114, such as a bezel that defines a face of the portable electronic device 100. In some embodiments, the peripheral face region 114 can define the cover layer 108 of the portable electronic device 100, where the peripheral face region 114 surrounds a peripheral edge of the cover layer 108. Although FIG. 1C illustrates the peripheral face region 114 as having a generally rectangular shape, the peripheral face region 114 can also have a generally elliptical or circular shape, or any other appropriate shape.

According to some embodiments, the peripheral face region 114 can include the light-notification unit 110. The light-notification unit 110 can be disposed at an external surface of the housing 102 or carried within the housing 102. In some embodiments, the light-notification unit 110 can include individual light-emitting units 112 (e.g., LEDs) that are carried by a light transmissive material of the peripheral face region 114, the housing 102, or other region that is injection molded and/or over-molded with light-emitting units 112. Accordingly, the peripheral face region 114 can include the light transmissive material which is sufficiently transmissive to light (e.g., translucent, transparent, etc.) to enable the amount of light generated by the light-emitting units 112 to pass through the housing 102 and/or peripheral face region 114 such as to be visible to the user while the portable electronic device 100 is worn by the user. Additionally, the light transmissive material can be clear (i.e., free of color) or any specific type of color such as to match or conform to a colored appearance of the housing 102. In some examples, the light transmissive material can be transparent, translucent, or frosted, and comprised of materials that include at least one of glass, plastic, clear acrylic, polycarbonate, ceramics, metals, and the like.

Figure 2B:
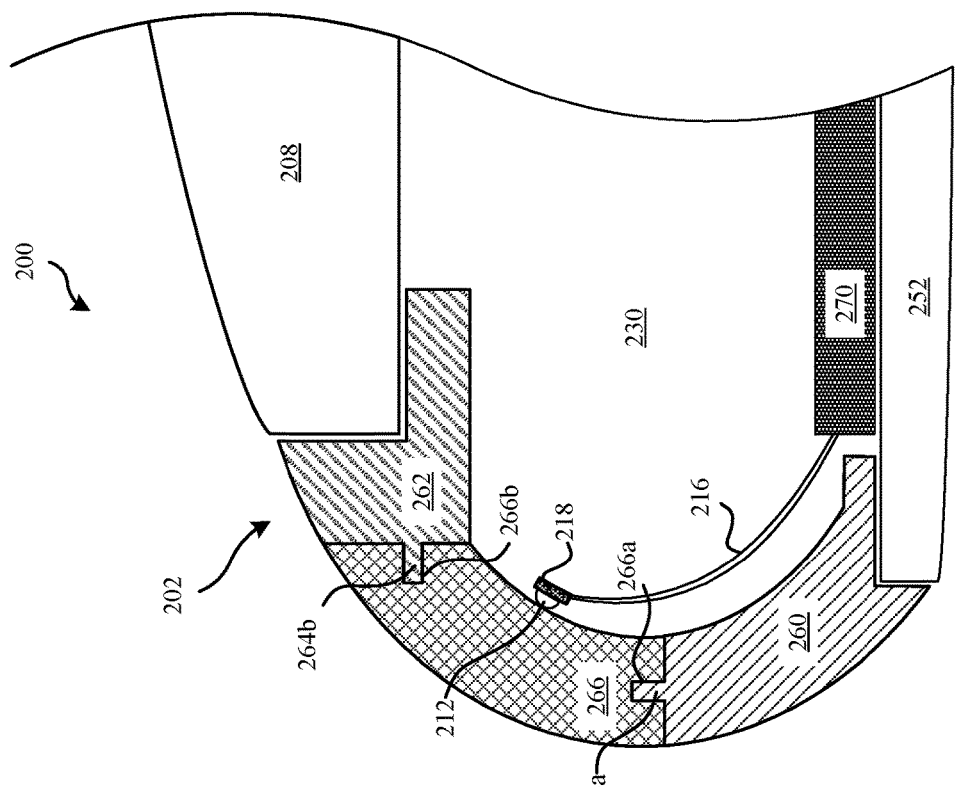
FIGS. 2A-2B illustrate perspective views of a portable electronic device that can be capable of implementing the various techniques described herein, according to some embodiments.
Figure 2A:
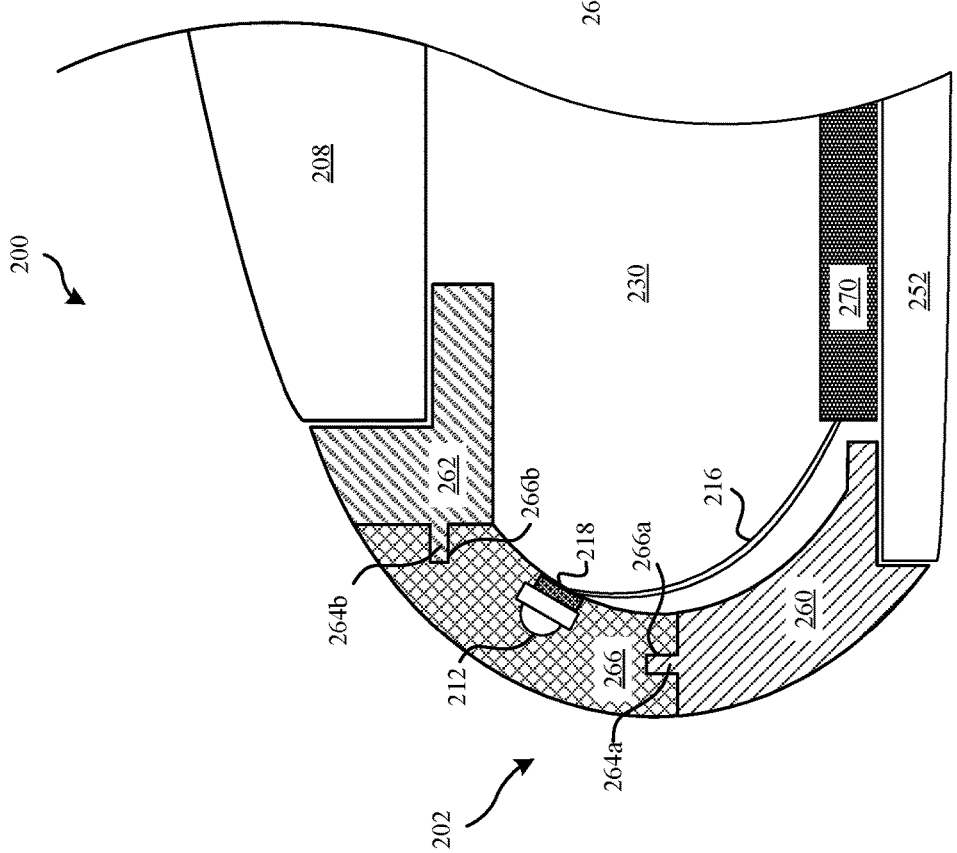

FIGS. 2A-2B illustrate cross-sectional views of a portable electronic device 200 as illustrated in FIGS. 1A-1C taken along the A-A line in FIG. 1C, in accordance with some embodiments. FIGS. 2A-2B illustrate the portable electronic device 200 includes a housing 202 having a cover layer 208 of a display assembly that is capable of receiving a touch event. The housing 202 can include a light-transmissive split 266 that can be molded between a lower housing section 260 and an upper housing section 262. According to some embodiments, the light-transmissive split 266 can also be interchangeably referred to as an illumination region and a luminescent region. According to some examples, the light transmissive material of the light-transmissive split 266 can be comprised of translucent, transparent, semi-transparent, or frosted plastic. In this manner, the light-transmissive split 266 can be sufficient to transmit an amount of light generated by the light-emitting units 212 through a housing 202. In some examples, frosted plastic can be beneficial in improving dispersion/diffusion of light throughout the light-transmissive split 266. Advantageously, frosted plastic can be favored over metal as the frosted plastic can more ably disperse light throughout the light-transmissive split 266. In particular, frosted plastic can include multiple light-reflective portions. In some embodiments, the light-transmissive split 266 can be substituted with a transparent window at the housing 202.

In some examples, the light-transmissive split 266 can extend between a lower housing section 260 and an upper housing section 262. The lower housing section 260 can include an interlocking structure 264a, such as a protruding structure, that can be molded to and/or attached to the light-transmissive split 266 and the upper housing section 262 can include an interlocking structure 264b that can be molded to and/or attached to the light-transmissive split 266. In some examples, the upper and lower housing sections 260, 262 are comprised of a metal, such as aluminum, aluminum alloy, titanium, and the like. Accordingly, in this manner, the metal of the upper and lower housing sections 260, 262 can be securely attached and coupled to the light-transmissive split 266 such as to improve an amount of rigidity of the light-transmissive split 266. The interlocking structures 264a-b can extend into receiving structures 266a-b (e.g., recessed structures) of the light-transmissive split 266. In some embodiments, the interlocking structures 264a-b and the receiving structures 266a-b can cooperate to provide an anchoring or tensioning mechanism for the light-transmissive split 266.

According to some embodiments, as illustrated in FIG. 2A, the light-emitting units 212 can be molded to the light-transmissive split 266 using an injection-molding and/or over-molding process. During the over-molding and/or injection-molding processes, the light transmissive material while in a first state (e.g., liquid state) can flow into an insert mold that is positioned at each of the interlocking structures 264a-b to shape the light-transmissive material into the light-transmissive split 266 having a curved shape. The light-transmissive material can flow into and around the light-emitting units 212 that were previously positioned within the insert mold. In this manner, the position of the light-emitting units 212 are secured in place by the light transmissive material that is subsequently hardened. According to some examples, the light transmissive material can be constructed from a material that can begin in a first state and may subsequently change to a second state. As an illustration, light transmissive material can be constructed from a plastic that begins in a first, liquid state and then subsequently changes to a second, solid state. In some embodiments, the material of the light-transmissive split 266 can be constructed from a glass-filled polyethylene terephthalate ("PET"). Alternatively, the light-transmissive split 266 can be constructed from a high-strength plastic such as polyaryletherketone ("PAEK") or polyether ether ketone ("PEEK"). Alternatively, the light-transmissive split 266 can be comprised of materials that include acrylic, glass, or ceramics. In some examples, the light-emitting units 212 can be first set in place, and subsequently molded with the light transmissive material such as to form a light-transmissive split 266. While in the liquid state, the plastic can be allowed to flow around and fill over the interlocking structures 264a-b. After flowing around and filling the interlocking structures 264a-b, the plastic material may subsequently be allowed to harden into receiving structures 266a-b (e.g., the plastic material is allowed to change into the second, solid state). Upon changing into the solid state, the light transmissive material can physically bond the upper and lower housing sections 260, 262 together, thus forming a side surface, side wall, and/or beveled edge of the housing 202.

According to some examples, the light-emitting units 212 can be attached to a circuit board 218. In some examples, the circuit board 218 can be flexible or rigid. In particular, the light-emitting units 212 of the circuit board 218 can be molded over with the light transmissive material to form a more secure and rigid bond between the light-emitting units 212 and the light-transmissive split 266 within the housing 202. For example, during an over-molding process, the light-emitting units 212 that are mounted onto the circuit board 218 can be secured to an insert mold of the housing 202. Subsequently, the light transmissive material is molded over the light-emitting units 212 and the circuit board 218. Advantageously, by molding the light-emitting units 212 and the circuit board 218, there can be a reduced risk of damaging the circuit board 218 during a subsequent installation process (e.g., positioning electronic components into the internal cavity 230 of the housing 202) as the circuit board 218 is not exposed outside of the light-transmissive split 266. Furthermore, molding the light-emitting units 212 within the light-transmissive split 266 can enable the tips of the light-emitting units 212 to be positioned much closer to the external surface of the light-transmissive split 266 such as to enable greater light transmissivity through the light-transmissive split 266.

As illustrated in FIG. 2B, according to some examples, the light-emitting units 212 that are included in the internal cavity 230 can be attached to a circuit board 218 that may be disposed behind the light-transmissive split 266. In some examples, the circuit board 218 can be flexible or rigid. A circuit board 218 comprised of rigid material can facilitate in the circuit board 218 being fastened into the housing 202, such as by using screws. Although a circuit board 218 comprising flexible material may facilitate in attaching the circuit board 218 to the light-transmissive split 266 having a curved internal surface and/or shape. Furthermore, during an installation procedure, the circuit board 218 can be mounted to the light-transmissive split 266 via an adhesive or epoxy. In contrast to molding the light-emitting units 212 within the light-transmissive split 266 as illustrated in FIG. 2A, the embodiment shown in FIG. 2B illustrates that the circuit board 218 can be exposed during an installation process. This may be advantageous in enabling the exposed leads of the circuit board 218 to be more easily secured to a printed circuit board 270.

In some examples, as illustrated in FIGS. 2A-2B the light-emitting units 212 and/or circuit board 218 are electronically coupled to a printed circuit board 270 that is carried at a bottom surface 252 of the housing 202 by way of a flex cable 216. In some embodiments, each of the light-emitting units 212 is electrically coupled to the same circuit board 218, where the circuit board 218 is disposed behind the light-transmissive split 266.

Additionally, in some embodiments, the light transmissive material of the light-transmissive split 266 can function to electrically isolate the upper and lower housing sections 260, 262. In this manner, electromagnetic interference is reduced and/or eliminated at the light-transmissive split 266 and can enable electromagnetic signals generated by electronic components disposed at the printed circuit board 270 (e.g., antenna, etc.) to more easily pass through the housing 202—in particular, the light-transmissive split 266. Additionally, the light-transmissive split 266 can enable electromagnetic signals to more easily pass through and reach electronic components within the internal cavity 230. The printed circuit board 270 can include additional electronic components, such as a dedicated microcontroller/processor for operating the light-emitting units 212.

FIGS. 3A-3B illustrates cross-sectional views of the portable electronic device 100 illustrated in FIGS. 1A-1C taken along the A-A line in FIG. 1C, in accordance with some embodiments. FIG. 3A illustrates a portable electronic device 300 having a light-notification unit 310 including light-emitting units 312 that can be molded by a light transmissive material to form a light-transmissive split 366. In some examples, the light-emitting units 312 can be first set in place, and subsequently molded with the light transmissive material to form the light-transmissive split 366. According to some examples, the light transmissive material of the light-transmissive split 366 can be comprised of translucent, transparent, semi-transparent, or frosted materials, such as glass, plastic, metal, ceramics, polycarbonates, and the like. In this manner, the light-transmissive split 366 can sufficiently transmit an amount of light generated by the light-emitting units 312 through the housing 302.

In contrast to the portable electronic device 200 illustrated in FIGS. 2A-2B, the individual light-emitting units 312 are not electrically connected to a circuit board—e.g., the circuit board 218. Instead each of the light-emitting units 312 include leads (e.g., positive and negative leads) that electrically connect each of the light-emitting units 312 to a printed circuit board 370 that is disposed within an internal cavity 330. In this manner, each of the light-emitting units 312 is individually connected to the printed circuit board 370 with its own dedicated flex cable 316. One advantage to electrically connecting the light-emitting units 312 to the printed circuit board 370 with its own flex cable 316 is that it can reduce latency such as to increase the response time associated with when the processor (not illustrated) transmits a control signal to operate an individual light-emitting unit 312. In some examples, a portion (or all) of the flex cable 316 can be molded within the light-transmissive split 366.

The portable electronic device 300 illustrated in FIG. 3A can include a housing 302 having a light-transmissive split 366. In some examples, the light-transmissive split 366 can extend between a lower housing section 360 and an upper housing section 362. The lower housing section 360 can include an interlocking structure 364a that can be molded to and/or attached to the light-transmissive split 366 and the upper housing section 362 can include an interlocking structure 364b that can be molded to and/or attached to the light-transmissive split 366. In some examples, the upper and lower housing sections 360, 362 are comprised of a metal, plastic, ceramic, and the like. Accordingly, in this manner, the upper and lower housing sections 360, 362 can be securely attached and coupled to the light-transmissive split 366 such as to improve an amount of rigidity of the light-transmissive split 366. The interlocking structures 364a-b can extend into receiving structures 366a-b of the light-transmissive split 366. In some embodiments, the interlocking structures 364a-b and the receiving structures 366a-b can cooperate to provide an anchoring or tensioning mechanism for the light-transmissive split 366. The light-emitting units 312 can be surrounded by the over-molded material. According to some embodiments, the light-transmissive material can form the light-transmissive split 366 via an over-molding and/or injection-molding process, as described herein.

FIG. 3B illustrates a portable electronic device 301 having light-emitting units 312 that can be molded by a light transmissive material to form an elongated light-transmissive split 368. In some examples, the light-emitting units 312 are first set in place, and subsequently molded with a light transmissive material to form the elongated light-transmissive split 368. In contrast to the portable electronic device 300 illustrated in FIG. 3A, the portable electronic device 301 illustrated in FIG. 3B does not include an upper housing section—e.g., the upper housing section 362 having an interlocking structure—e.g., the interlocking structure 364b that can be anchored to the elongated light-transmissive split 368. In contrast, the elongated light-transmissive split 368 can include an anchoring portion 374 having an angled support feature 372 that extends into the internal cavity 330 of the housing 302. The angled support feature 372 can be capable of supporting the cover layer 308 in a manner similar to the upper housing section 362. In some examples, the anchoring portion 374 can be referred to as a bezel that provides structural support to the cover layer 308.

In contrast to the portable electronic device 300 illustrated in FIG. 3A, the elongated light-transmissive split 368 of the portable electronic device 301 provides additional structural rigidity and/or enhances the structural rigidity of the housing 302. For example, by eliminating a light-transmissive split—e.g., the light-transmissive split 266—that is coupled at opposite ends to upper and lower housing sections, the housing 302 of the portable electronic device 300 is rendered more structural rigid and less susceptible to a torsional moment when torque is applied to a region of the housing 302 proximate to the elongated light-transmissive split 368.

In some examples, the elongated light-transmissive split 368 can include a receiving structure 366a that can be capable of receiving an interlocking structure 364a of the lower housing section 360. In some examples, the lower housing section 360 can include metal, plastic, ceramic, and the like. Accordingly, in this manner, the lower housing section 360 can be securely attached and coupled to the elongated light-transmissive split 366 such as to improve an amount of rigidity of the light-transmissive split 368. In some embodiments, the interlocking structure 364a and the receiving structure 366a can cooperate to provide an anchoring or tensioning mechanism for the elongated light-transmissive split 366. In some examples, the light-emitting units 312 can be first set in place, and subsequently molded with the light transmissive material to form the elongated light-transmissive split 368. According to some examples, the light transmissive material of the elongated light-transmissive split 368 can be comprised of translucent, transparent, semi-transparent, or frosted material, such as glass, plastic, polycarbonate, and the like. In this manner, the elongated light-transmissive split 368 can be sufficient to transmit an amount of light generated by the light-emitting units 312 through the housing 302.

Although FIGS. 3A-3B illustrate that the light-emitting units 312 are molded within the light-transmissive split 366 and the elongated light-transmissive split 368, in other embodiments, the light-emitting units 312 can be attached to a circuit board—e.g., the circuit board 218—and disposed behind the light-transmissive split 366 and the elongated light-transmissive split 368, in a manner similar to the embodiment described with reference to FIG. 2B. In this manner, an amount of light generated by the light-emitting units 312 can still be transmitted through a transparent and/or translucent region of the housing 202. However, beneficially, these aforementioned techniques do not require molding of the light-emitting units 312 and/or the circuit board with the light transmissive material.

Figure 4:
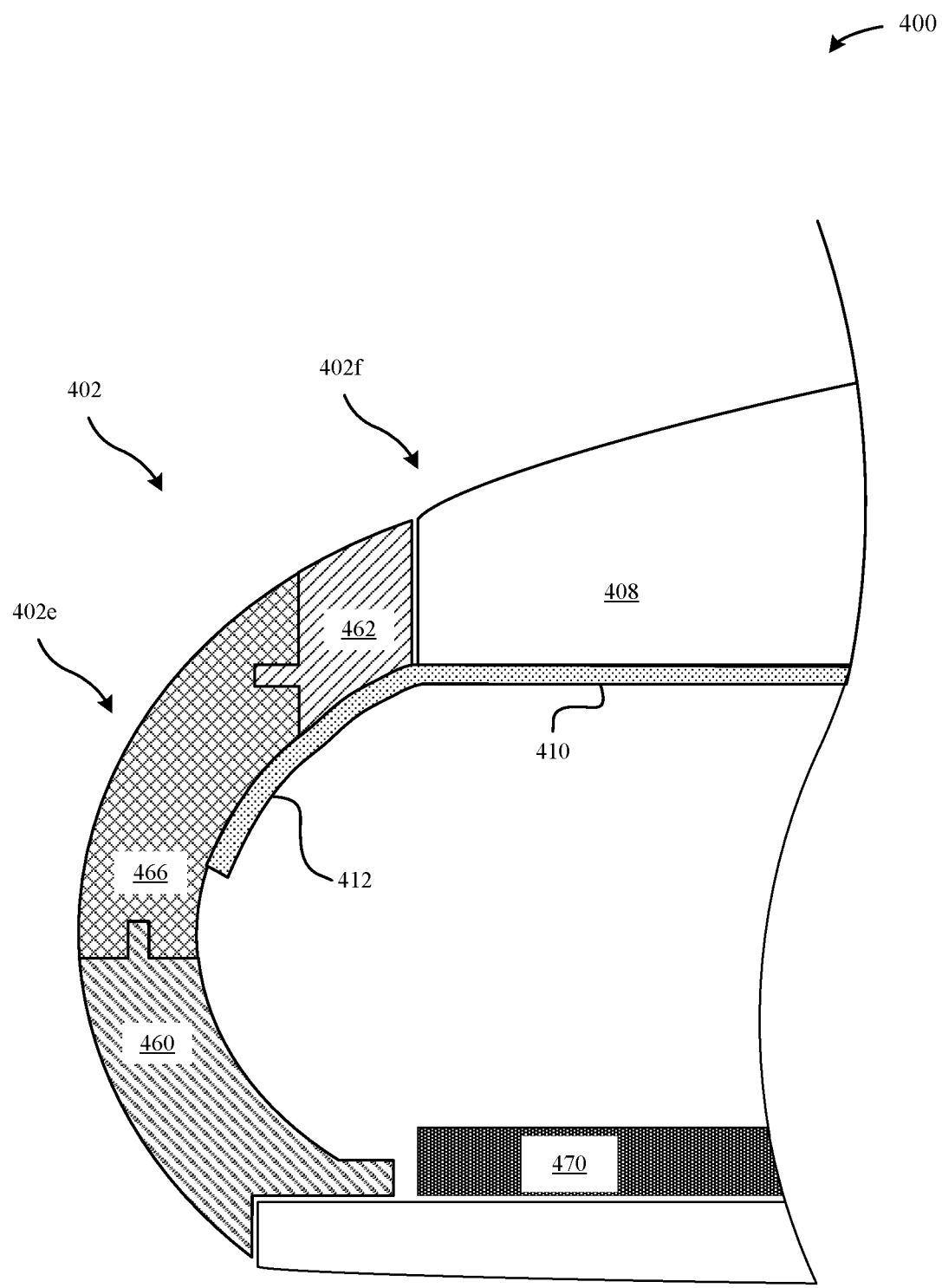
FIG. 4 illustrates a cross-sectional view of a portable electronic device that can be capable of implementing the various techniques described herein, according to some embodiments.

FIG. 4 illustrates a cross-sectional view of the portable electronic device 100 illustrated in FIGS. 1A-1C taken along the A-A line in FIG. 1C, in accordance with some embodiments. FIG. 4 illustrates a portable electronic device 400 having a light-emitting unit 412 that is an integrally-formed extension of a display layer 410 that is disposed below the cover surface 408. In this manner, the light-emitting unit 412 can function similarly to an edge-to-edge display of the display layer 410 where the portable electronic device 400 is capable of emitting an amount of light that extends past cover surface 408 and along the edges of the housing 402e as well as the face of the housing 402f that is adjacent to the edges of the housing 402e.

To accommodate for the amount of light that is emitted by the light-emitting unit 412, the upper housing section 462 that surrounds and defines the cover surface 408 can be made from a light transmissive material. Additionally, the housing 402 can include a light-transmissive split 466 that also facilitates to enable light generated by the light-emitting unit 412 to pass through the housing 402. In some examples, both the upper housing section 462 and the light-transmissive split 466 are generally translucent or transparent such as to permit for an uninterrupted amount of light to be displayed along the edges and the face of the housing 402e to 402f. In this manner, the portable electronic device 400 can be capable of emitting an aesthetically pleasing continuous glow or amount of light. As illustrated in FIG. 4, the light-emitting unit 412 can be disposed behind the internal surface of the light-transmissive split 466, and secured to the internal surface by an adhesive or epoxy.

Beneficially, integrating the light-emitting units 412 with the display layer 410 does not require running a flex cable— e.g., the flex cable 216 or the circuit board 218—between the light-emitting units 412 and a printed circuit board 470. In this manner, the light-emitting units 412 are more protected from intrusion, such as when an object presses against the flex cable 216. Furthermore, by integrating the light-emitting units 412 onto the same display layer 410, a single lighting module (e.g., micro-controller) can be capable of concurrently operating both the display layer 410 and the light-emitting units 412. Additionally, the single lighting module can be capable of independently operating and controlling the display layer 410 and the light-emitting units 412. Additionally, each of the individual light-emitting units 412 can be independently controllable from each other. For example, the single lighting module can cause a control signal to be provided to the light-emitting units 412, thereby generating an amount of light by the light-emitting units 412, while also preventing a control signal from being transmitted to the display layer 410, thereby preventing an amount of light from being generated at the display layer 410. In other examples, each of the displayer layer 410 and the light-emitting units 412 can include their own dedicated lighting module. According to some examples, the display layer 410 and the light-emitting units 412 can include LED or OLEDs.

According to some embodiments, the light-emitting units 412 can include a touch input layer and/or force input layer for detecting a touch event at the display layer 410. In some examples, the light-emitting units 412 can be backed with a back layer having electrically conductive touch traces that are responsive to a change in capacitance caused by the user's fingertip make electrical contact with the electrically conductive touch traces. The back layer can be integral or isolated from the display layer 410. Accordingly, a user pressing against the back layer can exert changes in the amount and/or type of light emitted by the light-emitting units 412. In one example scenario, a user can drag the user's fingertip along the back layer to induce these changes. Thus, this back layer can act as a supplementary touch layer to the primary touch layer of the display layer 410. In another example, the light emitted by the light-emitting units 412 can correspond to movements and gestures of the user's fingertip along the back layer. In some examples, the back layer can be an extension of a touch input layer/force input layer that is associated with the display layer 410.

According to some embodiments, as illustrated in FIG. 4, the light-transmissive split 466 can also be backed by the light-emitting unit 412. In this example, the light-transmissive split 466 can be formed by molding light transmissive material around interlocking structures of the lower and upper housing sections 460, 462. In some examples, the light-emitting unit 412 can be adhered to the light-transmissive split 466 and/or the upper housing section 462 with an epoxy or an adhesive. According to some embodiments, the light-emitting unit 412 can be over-molded or injection-molded within the light-transmissive split 466. For example, the light-emitting unit 412 and the display layer 410 can be first mounted within a frame of the housing 402. Subsequently, light transmissive material can be molded over and around the light-emitting unit 412 such that the light-emitting unit 412 is securely held within the light-transmissive split 466. According to some examples, the light transmissive material of the light-transmissive split 466 can be comprised of translucent, transparent, semi-transparent, or frosted material, such as glass, polycarbonate, plastic, acrylic, metal, or ceramic.

Figure 5:
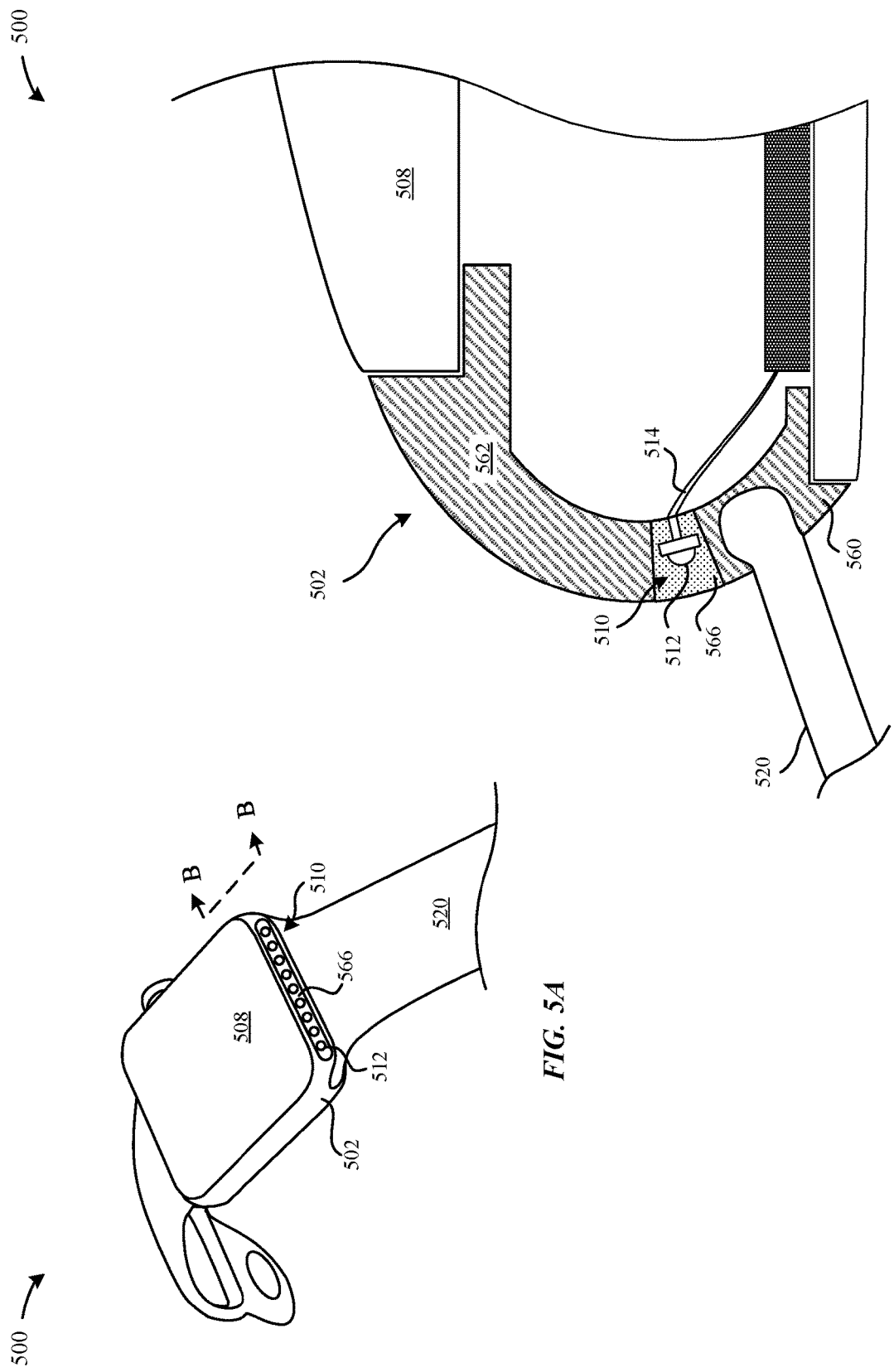
FIGS. 5A-5B illustrate a perspective view and a cross-sectional view of a portable electronic device that can be capable of implementing the various techniques described herein, according to some embodiments.

FIGS. 5A-5B illustrate a perspective view and a cross-sectional view of a portable electronic device 500, in accordance with some embodiments. FIG. 5A illustrates the portable electronic device 500 can include a light-notification unit 510 that is disposed along a bottom edge and/or lower surface of a housing 502. The housing 502 can include a cover layer 508 that is capable of receiving a touch event for a display assembly. In some embodiments, light-emitting units 512 of the light-notification unit 510 can be disposed right above or adjacent to a user attachment mechanism 520, such as a wrist band. By positioning the light-emitting units 512 adjacent to the user attachment mechanism 520, the light-notification unit 510 can emit an amount of light (e.g., a glow of light) onto the user's wrist. The light-emitting units 512 can be electrically coupled to a printed circuit board via a flex cable 514.

According to some embodiments, the light-emitting units 512 can be molded within a light-transmissive split 566 that is disposed adjacent to the user attachment mechanism 520. Unlike the light-transmissive split—e.g., the light-transmissive split 266 of the portable electronic device 200—disposed along a bezel, the light-notification unit 510 can transmit lighted notifications and user information at an angle that is substantially different from the display—e.g., the display assembly 106. Beneficially, when the back of the hand is facing away from the user's eyes such that the display assembly 106 is also facing away from the user's eyes, the light-notification unit 510 can still be capable of presenting lighted notifications that can be readily perceived by the user's eyes due to its location along the lower surface of the housing 502. In this manner, user notifications can still be readily perceived by the user, even when a face of the portable electronic device 500 is turned away from the user.

Additionally, the light-transmissive split 566 can be arranged along a peripheral edge of the housing 502, as illustrated in FIG. 5B. FIG. 5B illustrates a cross-sectional view of the portable electronic device 500 illustrated in FIG. 5A taken along the B-B line in FIG. 5A, in accordance with some embodiments. In some examples, the light-emitting units 512 can be first set in place, and subsequently molded with the light transmissive material to form the light-transmissive split 566. According to some examples, the light transmissive material of the light-transmissive split 566 can be comprised of translucent, transparent, semi-transparent, or frosted material, such as glass, polycarbonate, plastic, acrylic, metal, or ceramic. In this manner, the light-transmissive split 566 can be sufficient to transmit an amount of light generated by the light-emitting units 512 through the housing 502.

According to some embodiments, the light-transmissive split 566 can be attached to lower and upper housing sections 560, 562. In some examples, the light-transmissive split 566 can include a receiving structure, as described above, that can be capable of receiving respective interlocking structures of the lower and upper housing sections. In some examples, the lower and upper housing sections 560, 562 can include metal, plastic, ceramic, and the like.

Figure 6:
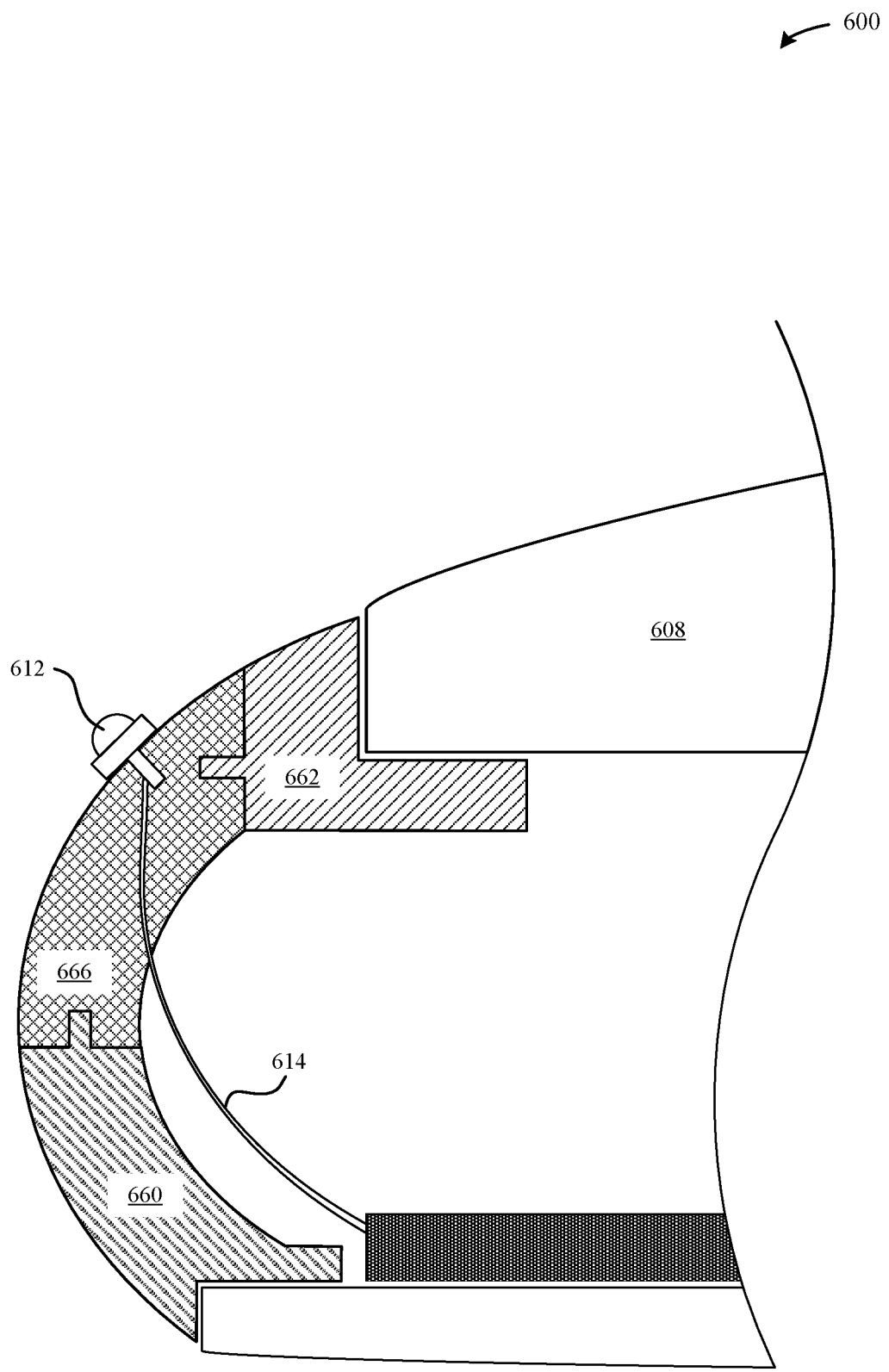
FIG. 6 illustrates a cross-sectional view of a portable electronic device that can be capable of implementing the various techniques described herein, according to some embodiments.

FIG. 6 illustrates a cross-sectional view of the portable electronic device 100 illustrated in FIGS. 1A-1C taken along the A-A line in FIG. 1C, in accordance with some embodiments.

FIG. 6 illustrates a portable electronic device 600 having a housing includes a cover layer 608 that is capable of receiving a touch event for a display assembly. The portable electronic device 600 can include light-emitting units 612 that are mounted directly onto an external surface of an edge region 666 of the portable electronic device 600. In particular, during a manufacturing process, light-emitting units 612 can be mounted directly onto the external surface of the edge region 666. The edge region 666 can be formed between the lower and upper housing sections 660, 662. Connection ends of the light-emitting units 612 are electrically connected to the flex cables 614. In contrast to other portable electronic devices described herein, the light-emitting units 612 can protrude from the external surface of the housing, thereby imparting the housing with a textured feel and appearance.

According to some embodiments, the edge region 666 can include a light transmissive material such that the edge region 666 can refract light emitted from the light-emitting units 612 along the edges of the housing. In some examples, the edge region is generally translucent or transparent such as to permit for an amount of light to pass through the edge region 666 of the housing and into the internal cavity of the portable electronic device 600. However, in other embodiments, the edge region 666 can also be constructed from a non-light transmissive material, such that the edge region 666 is rendered opaque to light transmissivity. In particular, the edge region 666 can be constructed from material having a more reflective quality, such as a mirrored finish or surface to enable more light generated by the light-emitting units 612 to refract away from the portable electronic device 600. The edge region 666 can be formed from any combination of plastic, polymer, or metal.

According to some embodiments, the light-emitting units 612 can be electrically coupled to a printed circuit board via flex cable 614. In some examples, each of the light-emitting units 612 can have its own dedicated flex cable 614. In other examples, the light-emitting units 612 can be collectively electrically coupled to a circuit board that has its own dedicated flex cable that is connected to the printed circuit board.

Figures 7A, 7B:
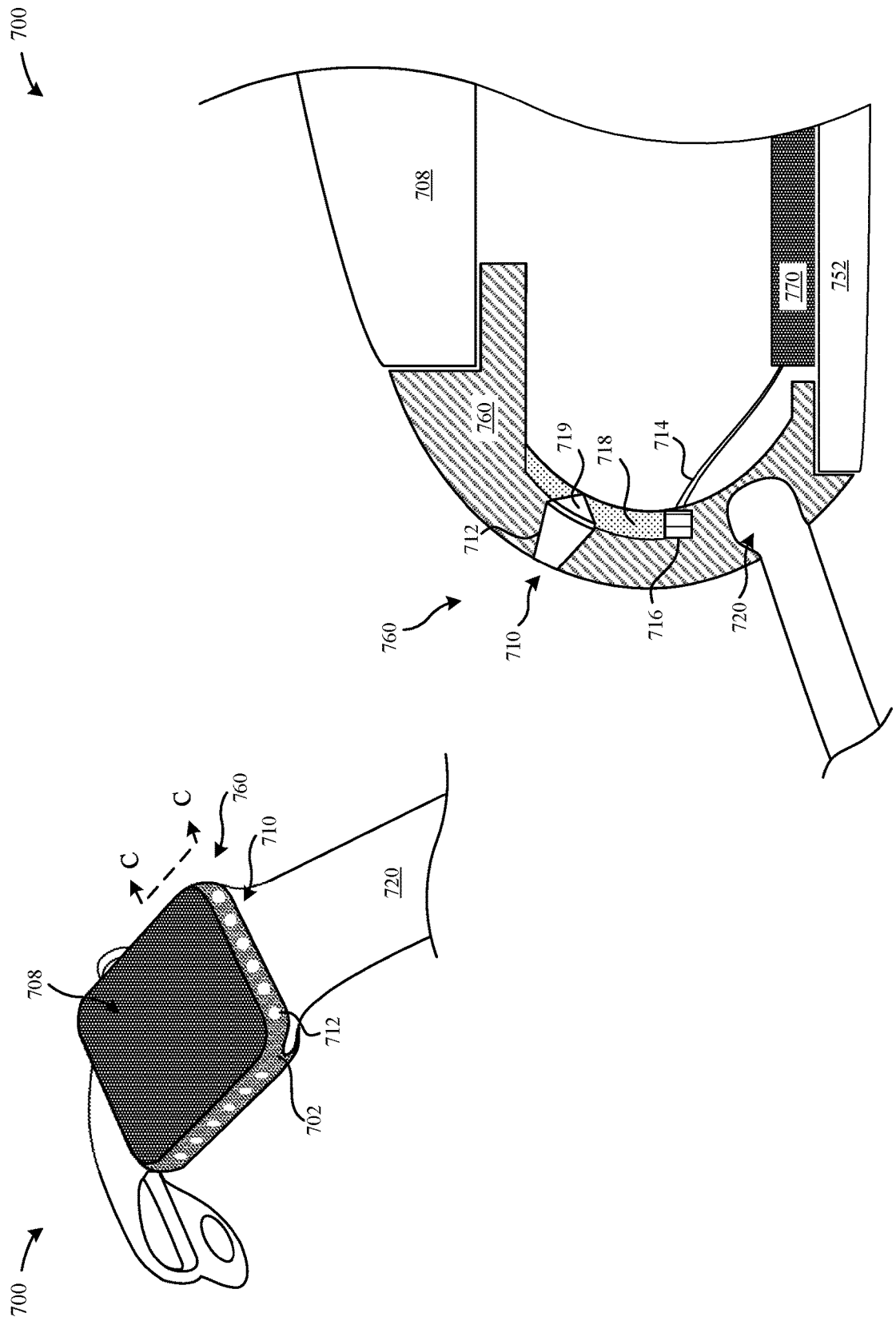
FIGS. 7A-7B illustrate a perspective view and a cross-sectional view of a portable electronic device that can be capable of implementing the various techniques described herein, according to some embodiments.

FIGS. 7A-7B illustrate a perspective view and a cross-sectional view of a portable electronic device 700, in accordance with some embodiments. FIG. 7A illustrates the portable electronic device 700 can include a housing 702 having a display 708 and a user attachment mechanism 720. The portable electronic device 700 can include a light-notification unit 710. The light-notification unit 710 can include micro-perforations 712 that are formed through a side section 760 of the housing 702. In particular, the micro-perforations 712 can impart the housing 702 with an appearance of having a backlist visual display.

FIG. 7B illustrates a cross-sectional view of the portable electronic device 700 illustrated in FIG. 7A taken along the C-C line in FIG. 7A, in accordance with some embodiments. According to some examples, each of the micro-perforations 712 is sufficiently small in diameter such that a micro-lens 719 cannot be readily distinguished from the remaining regions of the housing 702 by the naked human eye. In some examples, the micro-perforations 712 can extend generally from an external surface of the side section 760 to an internal surface of the same side section 760. In some embodiments, the micro-perforations 712 can be filled with a transparent or translucent material, such as glass, plastic, and/or other material that is sufficient to enable light to pass through the housing 702. Beneficially, the micro-perforations are sufficiently small, thereby minimizing contaminants (e.g., moisture, dirt, etc.) from entering into the housing 702 and causing corrosion of the housing 702.

According to some embodiments, the micro-perforations 712 can be arranged at a pattern along the side section 760 of the housing 702, a face region (e.g., front face opening, etc.) of the housing 702, a bottom surface of the housing 702, and/or an edge of the housing 702. Additionally, the number of micro-perforations 712 arranged at the housing 702 can vary from a few to several hundreds. It should be noted that when the micro-perforations 712 are unlit (e.g., non-backlit), then the micro-perforations 712 can be indistinguishable to the naked human eye from the remaining regions of the housing 702. Beneficially, in this manner, even with the presence of several micro-perforations 712 along the housing 702, the housing 702 is able to retain a generally uniform colorized and texturized appearance when the micro-perforations are unlit.

According to some embodiments, and as illustrated in FIG. 7B, the light-notification unit 710 can include a light source 716 that is coupled to one side of a light guide 718. The light guide 718 can be capable of transmitting and refracting light emitted by the light source 716 towards the micro-perforation 712. The micro-perforation 712 can include a base layer (such as by back-filling with acrylic) and a micro-lens 719 that is capable of concentrating the amount of light generated by the light source 716 through the micro-perforation 712 such that the amount of light appears to be emitted from the housing 702. For example, the micro-perforation 712 can taper towards the external surface of the side section 760. As illustrated in FIG. 7B, the light source 716 can be electrically coupled to a printed circuit board 770 via a flex cable 714. The printed circuit board 770 can be mounted onto a bottom surface 752 of the portable electronic device 700.

According to some examples, the light guide 718 can be adhered to a bottom layer of the micro-perforation 712 using an adhesive or epoxy. According to some examples, the housing 702 can be comprised from one or more materials that can include metal, plastic, ceramics, and the like. In contrast to the embodiments of the portable electronic device having a light-transmissive split—e.g., the light-transmissive split 266—it may be preferable for the portable electronic device 700 to have the housing 702 comprised of metal that is similar to the metal of the housing 702 in order to provide a generally uniform appearance and texture across the housing 702.

FIGS. 8A-8C illustrate top views of various exemplary portable electronic devices that can be capable of implementing the various techniques described herein, according to some embodiments. FIG. 8A illustrates a top view of a portable electronic device 800 having a light-notification unit 810a. The light-notification unit 810a can include multiple rows of light-emitting units 812a, b that are arranged to surround a periphery of the display 808 and are capable of being independently controllable by a processor of the portable electronic device 800. For example, a first row of light-emitting units 812a can be capable of emitting a first amount of light according to at least one of a first amount of color, duration, frequency, intensity, and/or pattern. Additionally, a second row of light-emitting units 812b can be capable of emitting a second amount of light according to at a second amount of color, duration, frequency, intensity, and/or pattern. In some examples, the second row of light-emitting units 812b can be included along an inner bezel of the portable electronic device 800 while the first row of light-emitting units 812a can be included along an outer bezel. Additionally, the portable electronic device 800 can be capable of causing the display 808 to emit an amount of light that is different from either of the first or second row of light-emitting units 812a-b. Additionally, the first row of light-emitting units 812a can emit an amount of light that is different from the second row of light-emitting units 812b.

FIG. 8B illustrates a top view of a portable electronic device 802 having a light-notification unit 810b. The light-notification unit 810b can include a bottom row 812c and a top row 812d of light-emitting units that are capable of being independently controlled or controlled in unison. As illustrated in FIG. 8B, the bottom and top row of light-emitting units 812c, d can be capable of emitting a sequential pattern of lights moving in a left-direction, such as to indicate to a user to make a left turn when used in association with a map application. In another example, the bottom and top row of light-emitting units 812,d can be capable of emitting a sequential pattern of lights moving in a right-direction, such as to indicate to a user to make a right turn when used in association with the map application. In another example, only the bottom row of light-emitting units 812c can be capable of being emitted to indicate to a user to reverse direction when used in association with the map application. In some embodiments, the light-notification unit 810b can be independently controlled from the display 808. For example, the display 808 can indicate a user interface associated with the same map application or another application, such as a weather application. Beneficially, each of the light-emitting units 812 that are illuminated can combine to form a pattern of lights that provide meaningful user information, such as a turn direction as exemplified in this instance.

FIG. 8C illustrates a top view of a portable electronic device 804 having a light-notification unit 810c. The light-notification unit 810c can include a ring of light-emitting units 812e that arranged along a periphery of the display 808. In some examples, the display 808 can be capable of displaying a clock with a current time of day. Additionally, the light-notification unit 810c can also include independently controllable individual LEDs that can emit a pattern of lights that also corresponds to the time of day. Because the light-notification unit 810c is independently controllable from the display 808, the light-notification unit 810c can be capable of emitting the pattern of lights that corresponds to the time of day even while the display 808 is turned off. Beneficially, each of the light-emitting units 812 that are illuminated can combine to form a pattern of lights that provide meaningful user information, such as a current time of day.

FIGS. 9A-9C illustrate various views for forming a portable electronic device 900, according to some embodiments. FIG. 9A illustrates an exploded perspective view 901 of a portable electronic device 900 that can be formed from different components, including a housing 902, a printed circuit board 970, a light-notification unit 910, a display layer 906, and a cover glass 904.

According to some embodiments, the light-notification unit 910 can be installed through a non-molding procedure. As illustrated in FIG. 9B, in particular, the light-notification unit 910a is attached to a flexible circuit board having a board-to-board connector 916. The light-notification unit 910*a* can include a series of light-emitting units 912 that are disposed along a periphery of the light-notification unit 910*a*. During the installation process, the light-notification unit 910*a* can be positioned into an internal cavity of the housing 902 and subsequently secured against an internal surface (or inside walls) of the housing 902. The internal surface of the housing 902 can include a frame for securing the light-notification unit 910*a*. Once the light-notification unit 910*a* is installed and secured to the frame of the internal surface of the housing 902, the board-to-board connector 916 can be electrically coupled to a connector of an electronic component (e.g., printed circuit board 970). In this manner, the light-notification unit 910*a* can be sufficiently supported by the frame of the housing 902, thereby removing the need to mold the light-notification unit 910*a* to the housing 902. In some examples, the housing 902 can include a light-transmissive split—e.g., the light-transmissive split 266—which can be disposed adjacent to the light-notification unit 910*a*, such as disposing the light-notification unit 910*a* behind the light-transmissive split 266. Additionally, an epoxy or adhesive can be used to secure the light-notification unit 910*a* to the housing 902.

According to some embodiments, the light-notification unit 910 can be installed through an injection molding procedure. As illustrated in FIG. 9C, in conjunction with the injection molding procedure, the housing 902 can include a flex circuit board 914*c*. During the injection molding procedure, the light-notification unit 910*b* can be secured against an internal surface (or inside walls) of the housing 902. The internal surface of the housing 902 can include a frame for securing the light-notification unit 910*b*. Once the light-notification unit 910*b* is installed and secured to the frame of the internal surface of the housing, light transmissive material can be insert-molded over the light-notification unit 910*b* and the flex circuit board 914*c* within a mold cavity. According to some embodiments, the light-emitting units 912 of the light-notification unit 910 can be molded into the housing 902. In some embodiments, the light-emitting units 912 can include the flex circuit board 914*c* which is also insert-molded with the light-emitting units 912. Alternatively, in some embodiments, only the light-emitting units 912 are insert-molded by the light transmissive material. Thereafter, the exposed leads of the light-emitting units 912 can be electrically coupled to the flex circuit board 914*c*.

Figure 10:
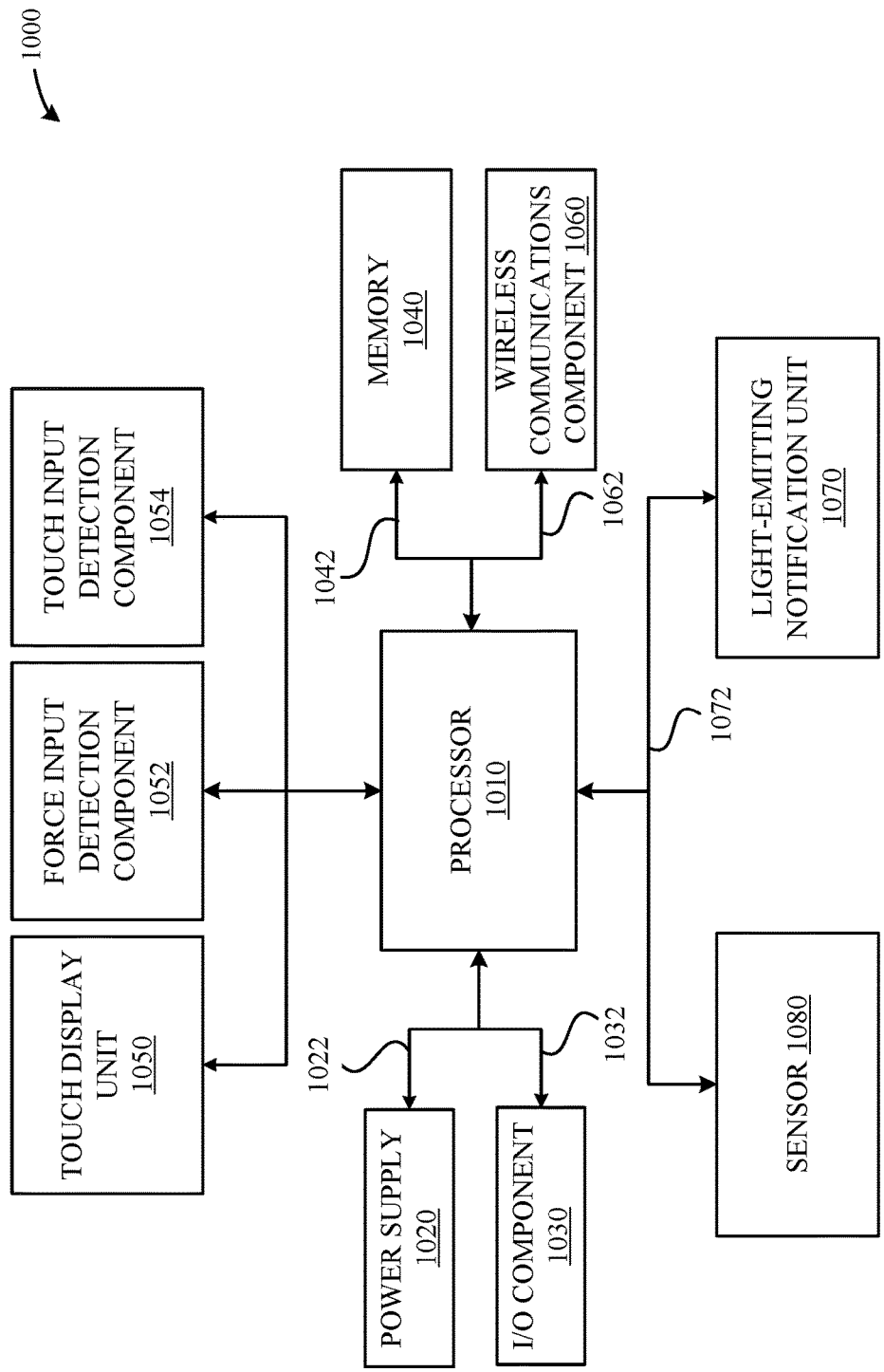
FIG. 10 illustrates a block diagram of a portable electronic device that can be configured to implement different aspects of the various techniques described herein, in accordance with some embodiments.

FIG. 10 illustrates a block diagram of a portable electronic device that is capable of implementing the various techniques described herein, in accordance with some embodiments. As illustrated in FIG. 10, a portable electronic device 1000—e.g., the portable electronic device 1000—can include one or more processors 1010 for executing functions of the portable electronic device 1000. The one or more processors 1010 can refer to at least one of a central processing unit (CPU) or microcontrollers for performing dedicated functions.

According to some embodiments, the portable electronic device 1000 can include a power supply 1020 that can be capable of providing power to the portable electronic device 1000. In some examples, the power supply 1020 can refer to a rechargeable battery, where the power supply 1020 is connected to the processor 1010 via one or more connection cables 1022.

According to some embodiments, the portable electronic device 1000 can include one or more input/output (I/O) components 1030 that enable communication between a user and the portable electronic device 1000. In some cases, the I/O component 1030 can refer to button, rotatable digital crown, or a switch that is capable of being actuated by the user. In some cases, the I/O component 1030 can refer to a soft key that is flexibly programmable to invoke any number of functions. In some examples, the I/O component 1030 can refer to a switch having a mechanical actuator (e.g., spring-based switch, slide-switch, rocker switch, etc.) or other moving parts that enable the switch to be actuated by the user's appendage. In some examples, the I/O component 1030 can refer to a capacitive switch. In some examples, the I/O component 1030 can refer to a slide-switch that can be actuated between a first position and a second position. When the I/O component 1030 is actuated, the I/O component 1030 can cause an electrical signal to be provided to the processor 1010 via cable 1032.

According to some embodiments, the portable electronic device 1000 can include at least one memory 1040, which can include a single disk or multiple disks (e.g., hard drives), and includes a storage management module that manages one or more partitions within the memory 1040. In some cases, the memory 1040 can include flash memory, semiconductor (solid state) memory or the like. The portable electronic device 1000 can also include a Random Access Memory (RAM) and a Read-Only Memory (ROM). The ROM can store programs, utilities or processes to be executed in a non-volatile manner. The RAM can provide volatile data storage, and stores instructions related to the operation of the portable electronic device 1000. In some embodiments, the memory 1040 refers to a non-transitory computer readable medium, where an operating system (OS) is established at the memory 1040 that can be configured to execute applications or software programs that are stored at the memory 1040. In some embodiments, a data bus 1042 can facilitate data transfer between the memory 1040 and the processor 1010.

According to some embodiments, the portable electronic device 1000 can include a touch display unit 1050, where the touch display unit 1050 can be capable of presenting a user interface that includes at least one icon as part of a user interface, as described in greater detail herein. In some examples, each icon can be associated with a respective function that is capable of being executed by the processor 1010. In some cases, the touch display unit 1050 can include a display layer (not illustrated), which can include a liquid-crystal display (LCD), light-emitting diode display (LED), and so forth.

According to some embodiments, the touch display unit 1050 can include a touch input detection component 1054 that can be configured to detect changes in an electrical parameter (e.g., electrical capacitance value) when the user's appendage (acting as a capacitor) comes into proximity/into contact with the touch display unit 1050. According to some embodiments, the touch display unit 1050 can include a force input detection component 1052. In some cases, the force input detection component 1052 can be interchangeably referred to as an applied load detector. The force input detection component 1052 can be configured to detect an amount of force/an amount of load that is exerted by the user's appendage against the touch display unit 1050.

According to some embodiments, the portable electronic device 1000 can include a wireless communications component 1060. A network/bus interface 1062 can couple the wireless communications component 1060 to the processor 1010. The wireless communications component 1060 can communicate with other electronic devices via any number of wired or wireless communication protocols, including at least one of a global network (e.g., the Internet), a wide area network, a local area network, a wireless personal area network (WPAN), and the like. In some examples, the wireless communications component 1060 can transmit data to the other electronic devices over IEEE 802.11 (e.g., a Wi-Fi® networking system), Bluetooth (IEEE 802.15.1), ZigBee, Wireless USB, Near-Field Communication (NFC), a cellular network system (e.g., a 3G/4G/5G network such as UMTS, LTE, etc.), and the like.

According to some embodiments, the portable electronic device 1000 can include a light-emitting notification unit 1070 connected to the processor 1010 via a cable 1072. According to some embodiments, the light-emitting notification unit 1070 can be controlled independently of the touch display unit 1050. Beneficially, in this manner, the light-emitting notification unit 1070 can present notifications that are associated with applications that are different from the touch display unit 1050. Additionally, the processor 1010 can provide a control signal to operate the light-emitting notification unit 1070 while the touch display unit 1050 is inactive (i.e., not displaying any light). In some embodiments, any one of the I/O component 1030 or the touch display unit 1050 can be capable of adjusting the settings and parameters of the light-emitting notification unit 1070. For example, the user can utilize the touch display unit 1050 to pull up a menu having a user interface with options specific to the light-emitting notification unit 1070. By adjusting these options, the user can adjust the duration, color, frequency, intensity, active status, and the like of the light-emitting notification unit. These options will be described in greater detail with reference to FIG. 13.

According to some embodiments, the portable electronic device 1000 can include at least one sensor 1080 that is capable of detecting conditions that are present in the electronic device's surroundings or a general proximity to the portable electronic device 1000. In some examples, the sensor 1080 can refer to at least one of a microphone, a light sensor, a proximity sensor, an accelerometer, GPS sensor, a temperature sensor, a liquid sensor, a pressure sensor, a magnetic field sensor, a strain gage, a capacitive sensor, a force sensor, a gyroscope, a compass, a barometer, an IR light detector, thermometer, linear acceleration, fingerprint sensor, biometric sensor, facial detection sensor, and the like. In some embodiments, the sensor 1080 can determine whether the portable electronic device 1000 is exposed to a specific condition or stimulus. In response, the processor 1010 can modify one or more functionalities of the portable electronic device 1000 according to the condition or stimulus detected, such as by causing an amount of light to be generated by the light-emitting notification unit 1070 and/or the touch display unit 1050. According to some embodiments, the sensor 1080 and the processor 1010 can establish a feedback loop for modifying the one or more functionalities according to the specific environmental condition that is detected.

Figure 11:
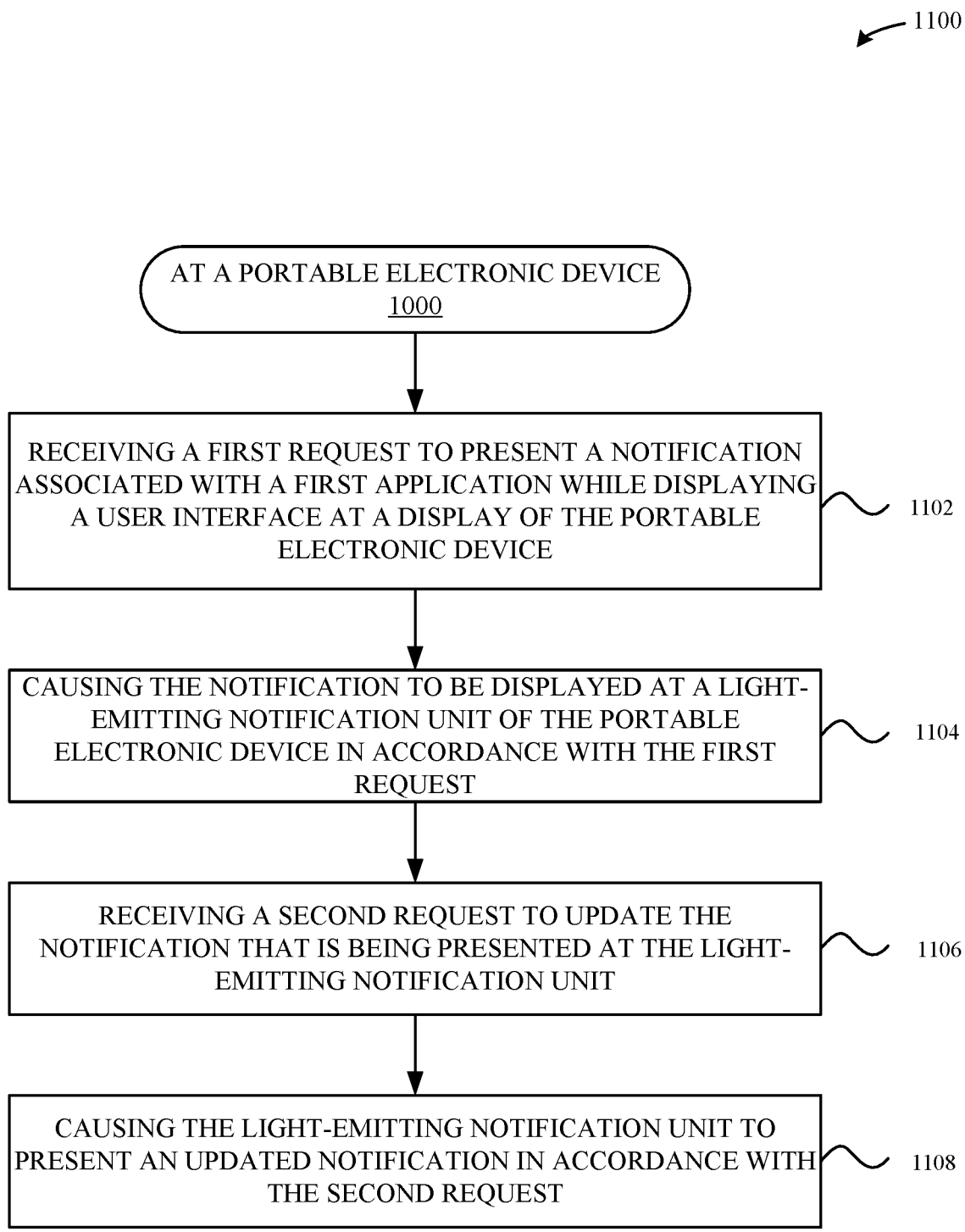
FIG. 11 illustrates a method for presenting a notification at a portable electronic device, according to some embodiments.

FIG. 11 illustrates a method 1100 for presenting a notification at a portable electronic device, in accordance with some embodiments. In particular, the portable electronic device—e.g., the portable electronic device 1000—can include a light-emitting notification unit 1070 capable of presenting notifications (e.g., user information) that is associated with an application. As illustrated in FIG. 11, the method 1100 begins at step 1102, where the portable electronic device 1000 receives a request to present a notification associated with a first application while the portable electronic device 1000 is presently displaying a user interface. In some examples, the user interface and the first application can be associated with a same application. In some examples, the user interface can be associated with a second application that is different from the first application. This can occur, for example, when the sensor 1080—e.g., a microphone detects a voice command associated with presenting a set of map directions to the user's workplace. In response to detecting the voice command, a touch display unit 1050 of the portable electronic device 1000 can present a graphical user interface that confirms the receipt of the voice command. According to some examples, the touch display unit 1050 can present the graphical user interface that is associated with an intelligent personal assistant application, and the voice command can be associated with a map application.

At step 1102, the portable electronic device 1000 can receive a first request to cause a notification associated with the first application to be presented by a light-emitting notification unit—e.g., the light-emitting notification unit 1070. In some examples, the portable electronic device 1000 can receive the first request while currently displaying a user interface at the touch display unit 1050.

In response, at step 1104, the portable electronic device 1000 can cause the light-emitting notification unit 1070 to present a notification in accordance with the first request. For example, referring to the scenario discussed above, the portable electronic device 1000 can cause a first control signal to be provided to the light-emitting notification unit 1070 that causes the light-emitting notification unit 1070 to present an amount of light that is associated with the map application. In particular, the light-emitting notification unit 1070 can present an initial direction associated with the map application. In some examples, the amount of light can have a predetermined intensity, color, intensity, directionality, pattern, and the like that corresponds to the voice command. Continuing with the foregoing example, the light-emitting notification unit 1070 can present a pattern of LEDs to blink in a green color in a repeating pattern along a left-side of the face of the portable electronic device 1000 to indicate that the user should turn left.

At step 1106, the portable electronic device 1000 can receive a second request that is associated with the first application in order to update the notification that is being presented at the light-emitting notification unit 1070.

At step 1108, in response to receiving the second request, the portable electronic device 1000 can transmit a second control signal to the light-emitting notification unit 1070 to cause an updated notification to be presented at the light-emitting notification unit 1070. According to some embodiments, the light-emitting notification unit 1070 can alter any one of a predetermined intensity, color, intensity, directionality, pattern, and the like of the notification that is being presented in accordance with the first request. For example, continuing with the foregoing example, the portable electronic device 1000 can receive an update that the user has reached the user's workplace. In response, the portable electronic device 1000 can cause a pattern of LEDs to blink in a red color in a repeating pattern along the entire peripheral face of the portable electronic device 1000 to indicate that the user has reached the destination. Additionally, it should be noted in that in some embodiments, the touch display unit 1050 can present the graphical user interface that is associated with the intelligent personal assistant application while the light-emitting notification unit 1070 presents the updated notification.

Figure 12:
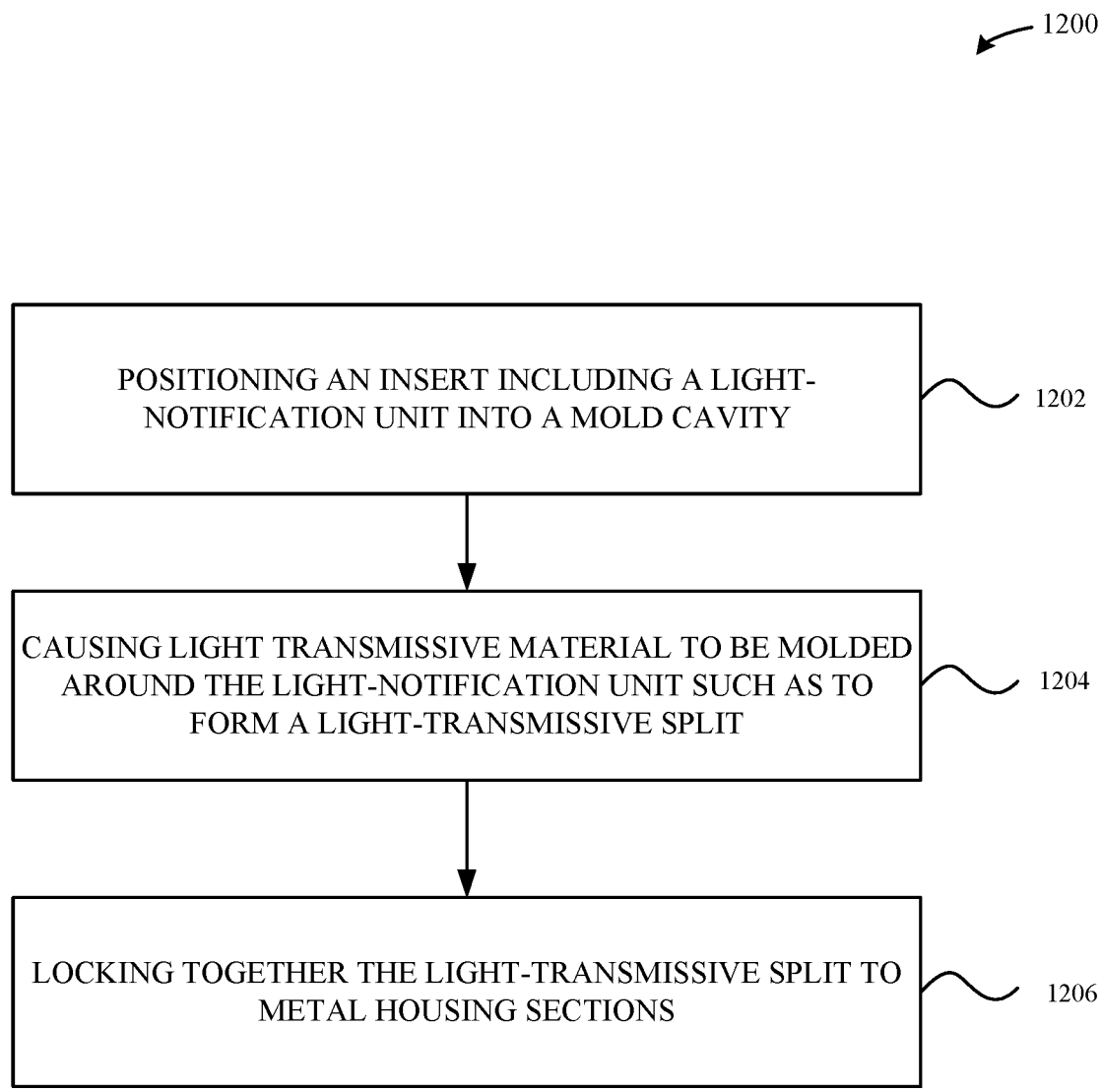
FIG. 12 illustrates a method for forming a portable electronic device that can be capable of implementing the various techniques described herein, according to some embodiments.

FIG. 12 illustrates a method 1200 for forming a portable electronic device, in accordance with some embodiments. In particular, the portable electronic device—e.g., the portable electronic device 300—can include a light-emitting unit— e.g., the light-emitting unit 312—that is molded within a housing 302 of the portable electronic device 300.

As illustrated in FIG. 12, the method 1200 begins at step 1202, where an insert including the light-emitting unit 312 can be positioned into a mold cavity having a shape of a split. According to some examples, the light-emitting unit 312 can include leads that are capable of being electrically connected to at least one of a circuit board, a flex cable, or a printed circuit board.

At step 1204, light transmissive material can be introduced into the mold cavity and be molded around the light-emitting unit 312 such as to form a light-transmissive split—e.g., the light-transmissive split 366. According to some embodiments, the light-transmissive split 366 can be formed to include receiving structures—e.g., the receiving structures 366*a-b* that are capable of being attached to housing sections—e.g., the lower and upper housing sections 360, 362. At step 1206, the receiving structures 366*a-b* can be locked together with interlocking structures 364*a-b* of the lower and upper housing sections 360, 362.

Figure 13:
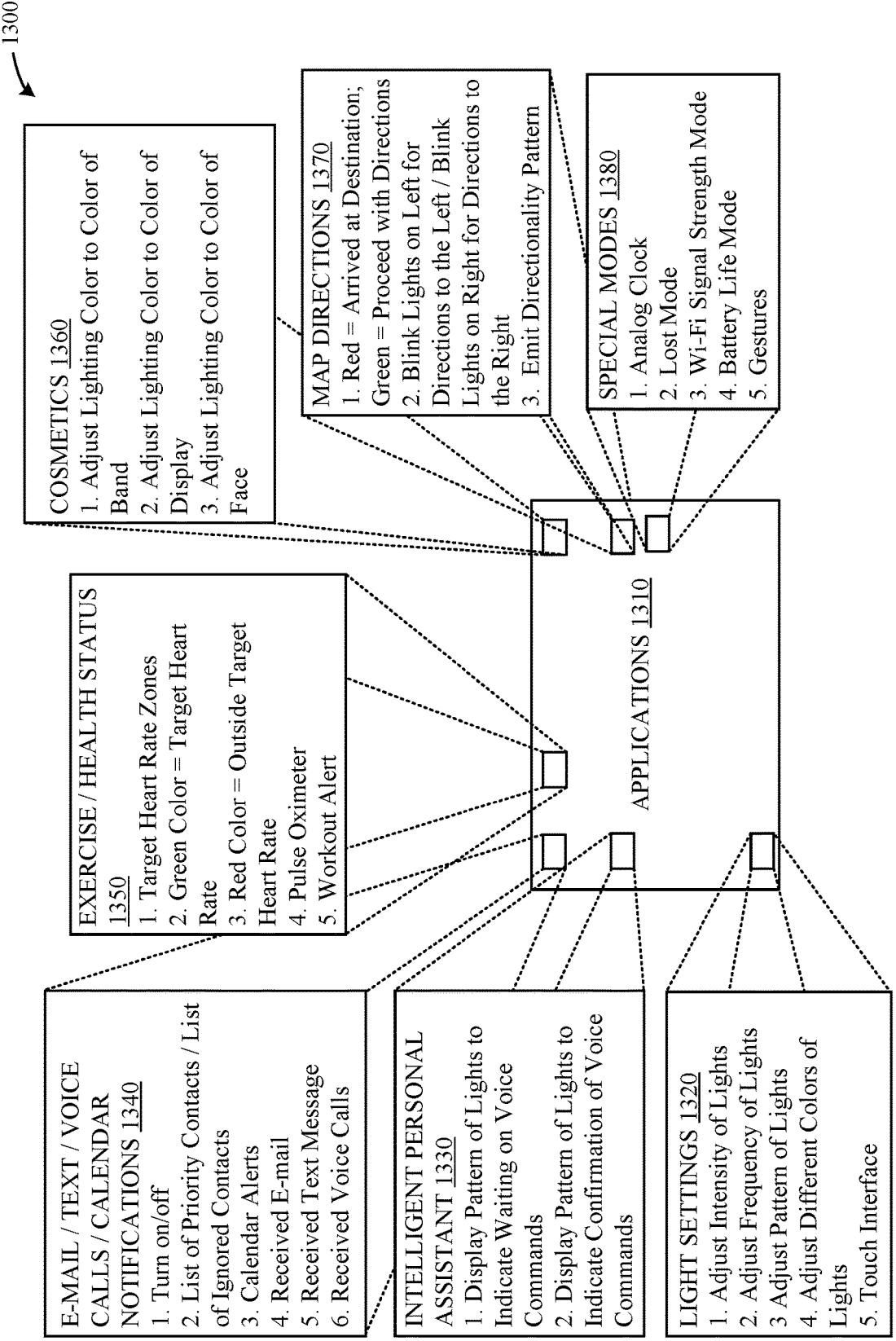
FIG. 13 illustrates a system diagram of various applications that are capable of implementing functions at a portable electronic device, according to some embodiments.

FIG. 13 illustrates a system diagram 1300 of an exemplary list of applications 1310 that can execute specific functions at the portable electronic device—e.g., the portable electronic device 100, according to some embodiments. In some cases, the exemplary list of applications 1310 can be established in the at least one memory 1040 and can be subsequently executed by the at least one processor 1010, as described in greater detail in FIG. 10. As illustrated in FIG. 13, the exemplary list of applications 1310 can include "Light Settings" 1320, "Intelligent Personal Assistant" 1330, "E-mail/Text/Voice Calls/Calendar Notifications" 1340, "Exercise/Health Status" 1350, "Cosmetics" 1360, "Map Directions" 1370, and "Special Modes" 1380. It should be noted that any one of these exemplary applications 1310 can be executed by using any combination of voice commands through an intelligent personal assistant, I/O components 1030, touch display unit 1050, sensor 1080, and the like.

In some examples, the "Light Settings" 1320 application can include specific settings that are user-adjustable, including: (1) "Adjust Intensity of Lights," (2) "Adjust Frequency of Lights," (3) "Adjust Pattern of Lights," (4) Adjust Different Colors of Lights, and (5) "Touch Interface." Referring to the "Touch Interface," in some examples, the light-transmissive material can be composed of plastic which can be backed by a touch sensitive layer. In this manner, each of the light-emitting units—e.g., the light-emitting units 112—can be activated through user touch input when the touch sensitive layer detects a touch event at an external surface of the light-transmissive material. For example, a user can activate the light-emitting units 112 by pressing the user's finger against the external surface.

In some examples, the "Intelligent Personal Assistant" 1330 application can include specific settings for executing light notifications in conjunction with an intelligent personal assistant that is stored at the portable electronic device 100. For example, while operating the intelligent personal assistant through a series of specific predetermined voice commands, the portable electronic device 100 can demonstrate recognition of the predetermined voice commands by emitting a predetermined pattern of lights.

In some examples, the "E-mail/Text/Voice Calls/Calendar Notifications" 1340 application can include specific settings to enable the light-notification unit 110 to emit an amount of light/predetermined pattern of lights in response to the portable electronic device 100 receiving an indication that an e-mail, text message, and the like are received. Additionally, the light-notification unit 110 can also emit an amount of light associated with a calendar event notification. According to some examples, the settings are user-adjustable to enable the user to select a list of contacts that should be ignored by the portable electronic device 100.

In some examples, the "Exercise/Health Status" 1350 application can enable a user to specify specific light notifications for use during a user's workout or during a health/medical diagnosis procedure (e.g., physiometric measurements). For example, during a workout, the user may indicate a target exercise heart range between 150 bpm to 175 bpm. When the portable electronic device 100 receives a request from the user to indicate the current heart rate, the portable electronic device 100 can emit a green color to indicate that the user's current heart rate is within a normal range. In contrast, when the user's current heart rate is in excess of 175 bpm, the portable electronic device 100 can emit a red color as a note of caution to stop exercising.

In some examples, the "Cosmetics" 1360 application can enable a user to adjust the color of the light emitted by the light-notification unit 110 to match, complement, or contrast with a color of a user attachment mechanism 120, cover layer 108, or peripheral face region 114 of the portable electronic device 100. In some examples, the "Map Directions" 1370 application can enable the light-notification unit 110 to emit an amount of light in association with using a map application. As illustrated in FIG. 8B, the light-notification unit 110 can emit a specific pattern of lights to indicate directionality.

In some examples, the "Special Modes" 1380 application can indicate "Special Modes" 1380 application that can enable specialized functions capable of being executed by the light-notification unit 110. For example, an analog clock as illustrated in FIG. 8C. While executing the "Lost Mode," the portable electronic device 100 can emit a series of flashing bright lights to enable the portable electronic device 100 to be found. While executing the "Wi-Fi Signal Strength Mode," the light-notification unit 110 can emit an amount of light that corresponds to an amount of signal strength available. For example, the light-notification unit 110 can emit a red amount of light when the Wi-Fi signal strength of a network is less than acceptable. While executing the "Battery Life Mode," the light-notification unit 110 can emit an amount of light that corresponds to a current amount of battery life present. For example, a red color generated by the light-notification unit 110 can represent a critical level of battery life remains, while a green color can represent an acceptable amount of battery life remains. Beneficially, the light-notification unit 110 can provide a more energy-efficient indicator than the cover layer 108 such as to conserve battery power during this process. While executing the "Gestures Mode," the light-notification unit 110 can emit an amount of light that corresponds to a gesture detected by a sensor (e.g., accelerometer, etc.) of the portable electronic device 100. For example, moving the user's hand in a side-to-side motion can cause the light-notification unit 110 to emit a purple color, while moving the user's hand in a vigorous diagonal motion can cause the light-notification unit 110 to emit a pattern of red and green color.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wearable electronic device, comprising:
   a housing at least partially defining an internal cavity, the housing comprising;
      a cover layer overlying a display disposed in the internal cavity;
      a side wall including an illumination region adjacent to and extending at least partially around a periphery of the cover layer and the display, the illumination region comprising a light-transmissive material;
   a processor capable of receiving an input signal and responding to the input signal by providing an illumination signal; and
   independently-controllable light-emitting units carried by the housing at the illumination region and in communication with the processor, the light-emitting units capable of presenting a notification by emitting an amount of light in accordance with the illumination signal.

2. The wearable electronic device of claim 1, further comprising:
   an environmental sensor in communication with the processor, the environmental sensor capable of detecting an environmental stimulus, and responding by providing a sensory signal to the processor based at least partially on the environmental stimulus.

3. The wearable electronic device of claim 2, wherein the processor is capable of receiving the sensory signal from the environmental sensor, and adjusting the illumination signal based at least partially on the sensory signal.

4. The wearable electronic device of claim 3, further comprising:
   a display assembly comprising a touch input sensor overlaid by the cover.

5. The wearable electronic device of claim 1, wherein the side wall comprises lower and upper housing sections, and the illumination region includes internal receiving structures that are coupled to locking structures of the lower and upper housing sections.

6. The wearable electronic device of claim 5, wherein the light-transmissive material includes glass, polycarbonate, plastic, acrylic or ceramic.

7. The wearable electronic device of claim 6, wherein the lower and upper housing sections comprise electrically conductive material, and the light-transmissive material comprises dielectric material that electrically isolates the lower and upper housing sections from each other.

8. A wearable electronic device, comprising:
   a housing defining an aperture and having a protective cover disposed in the aperture, the housing including a luminescence section that includes light-transmissive material adjacent to and at least partially surrounding the aperture;
   a processor;
   a touch sensitive display assembly disposed in the aperture and overlaid by the protective cover, the display assembly capable of detecting a touch event at the protective cover, and providing a corresponding detection signal to the processor, the processor providing an illumination signal based at least partially on the detection signal; and
   light-notification units carried by the housing at the luminescence section, the light-notification units capable of receiving the illumination signal, and emitting a pattern of light based at least partially on the illumination signal.

9. The wearable electronic device of claim 8, wherein the housing includes lower and upper housing sections, and the luminescence section includes receiving structures that are coupled to locking structures of the lower and upper housing sections.

10. The wearable electronic device of claim 9, wherein the lower and upper housing sections comprise electrically conductive material, and the light-transmissive material comprises dielectric material that electrically isolates the lower and upper housing sections from each other.

11. The wearable electronic device of claim 8, wherein the display assembly is capable of receiving a touch input for adjusting one or more settings of the light-notification units.

12. The wearable electronic device of claim 11, wherein the one or more settings include:
   a color of light;
   a brightness of light;
   a pattern of light; or
   a duration of light.

13. A wearable electronic device, comprising:
   a housing defining an aperture;
   a display assembly positioned at the aperture, an illumination section of the housing including a light-transmissive material at least partially surrounding the aperture and the display assembly;
   an environmental sensor for detecting an environmental stimulus, and providing a corresponding detection signal;
   a processor for receiving the detection signal, and generating an illumination signal based at least partially on the detection signal; and
   light-emitting units carried by the housing at the illumination section, wherein the light-emitting units are capable of receiving the illumination signal, and emitting a predetermined amount of light based at least partially on the illumination signal.

14. The wearable electronic device of claim 13, wherein:
   the display assembly includes a protective cover disposed in the aperture, the display assembly capable of receiving a control signal from the processor based at least partially on the detection signal, and presenting a visual icon based at least partially on the control signal.

15. The wearable electronic device of claim 14, wherein the processor controls the light-emitting units independent of the display.

16. The wearable electronic device of claim 13, wherein the light-emitting units are molded within the light-transmissive material at the illumination section.

17. The wearable electronic device of claim 13, wherein the environmental sensor is at least one of a global positioning system (GPS) sensor, a barometric pressure sensor, or a thermometer.

* * * * *